US012772329B2

(12) United States Patent
Wu et al.

(10) Patent No.: US 12,772,329 B2
(45) Date of Patent: Oct. 20, 2026

(54) DISCONTINUOUS RECEPTION (DRX) FOR UU-BASED CONNECTED VEHICLE COMMUNICATIONS

(71) Applicant: QUALCOMM Incorporated, San Diego, CA (US)

(72) Inventors: Shuanshuan Wu, San Diego, CA (US); Hong Cheng, Basking Ridge, NJ (US); Qing Li, Princeton Junction, NJ (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 18/334,663

(22) Filed: Jun. 14, 2023

(65) Prior Publication Data

US 2024/0422858 A1 Dec. 19, 2024

(51) Int. Cl.
*H04W 76/28* (2018.01)

(52) U.S. Cl.
CPC .................................. *H04W 76/28* (2018.02)

(58) Field of Classification Search
CPC .................................................... H04W 76/28
See application file for complete search history.

(56) References Cited

U.S. PATENT DOCUMENTS

2021/0227534 A1* 7/2021 Määttanen ............... G08G 5/26
2022/0046687 A1* 2/2022 Shrivastava .......... H04W 72/30
2024/0163966 A1* 5/2024 Li ......................... H04W 76/28

* cited by examiner

*Primary Examiner* — Ayanah S George
(74) *Attorney, Agent, or Firm* — Polsinelli LLP

(57) ABSTRACT

Systems and techniques are provided for wireless communications. A first UE can determine assistance information corresponding to one or more uplink (UL) transmissions of the first UE, the assistance information indicative of a periodicity of the one or more UL transmissions. The one or more UL transmissions can be vehicle-to-everything (V2X) UL transmissions of the first UE. The first UE can transmit the assistance information to a network entity. The network entity can determine a discontinuous reception (DRX) configuration for a second UE based on the assistance information, the DRX configuration indicative of a DRX on-duration. The second UE can receive information indicative of the DRX configuration from the network entity. The second UE can receive, from the network entity and during the DRX on-duration, a downlink transmission associated with the first UE. The downlink transmission can be a V2X downlink transmission.

30 Claims, 16 Drawing Sheets

DISCONTINUOUS RECEPTION (DRX) FOR UU-BASED CONNECTED VEHICLE COMMUNICATIONS

FIELD

The present disclosure generally relates to vehicle communications. For example, aspects of the present disclosure relate to discontinuous reception (DRX) for Uu-based vehicle-to-everything (V2X) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in vehicle-to-everything (V2X), vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Discontinuous reception (DRX) can be used to configure one or more channels (e.g., a physical downlink communication channel (PDCCH) and/or other channels) for periodic monitoring. For example, a user equipment (UE) can periodically or intermittently wake up to monitor for downlink data or transmissions during a periodic DRX-enabled state and enter a low-power sleep or idle mode outside of the periodic DRX-enabled state (e.g., during a DRX-disabled state). In some cases, DRX implemented by a UE can be used to improve UE power consumption (e.g., battery power consumption) based on the UE periodically entering a 'sleep' state for an 'off duration' during which the UE does not monitor some (or all) communication channels available to the UE.

V2X traffic generated by a connected vehicle (e.g., vehicle UE, V2X UE, etc.) can be associated with V2X traffic characteristics that can vary based on one or more V2X applications running on or for the V2X UE, where each V2X application may be associated with and/or provide one or more different V2X services. Each V2X service can be associated with or correspond to a respective V2X transmit (Tx) profile, quality-of-service (QOS) profile, etc. Different V2X services (e.g., of different V2X applications of different V2X UEs) can correspond to different V2X Tx and/or QoS profiles.

Systems and techniques are described herein for DRX for Uu-based communication (e.g., Uu-based V2X communication). In some aspects, the systems and techniques can be used to perform DRX between a plurality of UEs, where the plurality of UEs includes one or more vehicle UEs (e.g., V2X UEs). In some examples, a source UE associated with the Uu-based V2X communication is a connected vehicle (e.g., a V2X UE). In some cases, one or more destination UEs associated with the Uu-based V2X communication are power-limited UEs (e.g., such as a pedestrian UE, smartphone, mobile computing device, etc.). Further aspects and examples are described herein.

According to at least one illustrative example, a method of wireless communication performed at a user equipment (UE) is provided. The method includes: determining assistance information corresponding to one or more uplink (UL) transmissions of the UE, wherein the assistance information is indicative of a periodicity of the one or more UL transmissions and one or more traffic characteristics of the one or more UL transmissions; and transmitting, to a network entity, the assistance information.

In another illustrative example, an apparatus of a user equipment (UE) for wireless communication is provided. The apparatus includes at least one memory and at least one processor coupled to the at least one memory and configured to: determine assistance information corresponding to one or more uplink (UL) transmissions of the UE, wherein the assistance information is indicative of a periodicity of the one or more UL transmissions and one or more traffic characteristics of the one or more UL transmissions; and transmit, to a network entity, the assistance information.

In another illustrative example, a non-transitory computer-readable storage medium comprising instructions stored thereon which, when executed by at least one processor, causes the at least one processor to: determine assistance information corresponding to one or more uplink (UL) transmissions of the UE, wherein the assistance information is indicative of a periodicity of the one or more UL transmissions and one or more traffic characteristics of the one or more UL transmissions; and transmit, to a network entity, the assistance information.

In another illustrative example, an apparatus is provided for wireless communication. The apparatus includes: means for determining assistance information corresponding to one or more uplink (UL) transmissions of the UE, wherein the assistance information is indicative of a periodicity of the one or more UL transmissions and one or more traffic characteristics of the one or more UL transmissions; and means for transmitting, to a network entity, the assistance information.

According to at least one illustrative example, a method of wireless communication performed at a user equipment (UE) is provided. The method includes: receiving, from a network entity, information indicative of a discontinuous reception (DRX) configuration, wherein the DRX configuration is indicative of a DRX on-duration for the UE, and wherein the DRX configuration is associated with assistance information of a second UE different from the UE; and receiving, from the network entity, a downlink (DL) transmission associated with the second UE, wherein the DL transmission is received during the DRX on-duration.

In another illustrative example, an apparatus of a user equipment (UE) for wireless communication is provided. The apparatus includes at least one memory and at least one processor coupled to the at least one memory and configured to: receive, from a network entity, information indicative of a discontinuous reception (DRX) configuration, wherein the DRX configuration is indicative of a DRX on-duration for the UE, and wherein the DRX configuration is associated with assistance information of a second UE different from the UE; and receive, from the network entity, a downlink (DL) transmission associated with the second UE, wherein the DL transmission is received during the DRX on-duration.

In another illustrative example, a non-transitory computer-readable storage medium comprising instructions stored thereon which, when executed by at least one processor, causes the at least one processor to: receive, from a network entity, information indicative of a discontinuous reception (DRX) configuration, wherein the DRX configuration is indicative of a DRX on-duration for the UE, and wherein the DRX configuration is associated with assistance information of a second UE different from the UE; and receive, from the network entity, a downlink (DL) transmission associated with the second UE, wherein the DL transmission is received during the DRX on-duration.

In another illustrative example, an apparatus is provided for wireless communication. The apparatus includes: means for receiving, from a network entity, information indicative of a discontinuous reception (DRX) configuration, wherein the DRX configuration is indicative of a DRX on-duration for the UE, and wherein the DRX configuration is associated with assistance information of a second UE different from the UE; and means for receiving, from the network entity, a downlink (DL) transmission associated with the second UE, wherein the DL transmission is received during the DRX on-duration.

According to at least one illustrative example, a method of wireless communication performed at a network entity is provided. The method includes: receiving assistance information corresponding to one or more uplink (UL) transmissions of a first user equipment (UE); determining a discontinuous reception (DRX) configuration for a second UE based at least in part on the assistance information, wherein the DRX configuration is indicative of a DRX on-duration for the second UE; and transmitting, to the second UE, information indicative of the DRX configuration.

In another illustrative example, an apparatus of a network entity for wireless communication is provided. The apparatus includes at least one memory and at least one processor coupled to the at least one memory and configured to: receive assistance information corresponding to one or more uplink (UL) transmissions of a first user equipment (UE); determine a discontinuous reception (DRX) configuration for a second UE based at least in part on the assistance information, wherein the DRX configuration is indicative of a DRX on-duration for the second UE; and transmit, to the second UE, information indicative of the DRX configuration.

In another illustrative example, a non-transitory computer-readable storage medium comprising instructions stored thereon which, when executed by at least one processor, causes the at least one processor to: receive assistance information corresponding to one or more uplink (UL) transmissions of a first user equipment (UE); determine a discontinuous reception (DRX) configuration for a second UE based at least in part on the assistance information, wherein the DRX configuration is indicative of a DRX on-duration for the second UE; and transmit, to the second UE, information indicative of the DRX configuration.

In another illustrative example, an apparatus is provided for wireless communication. The apparatus includes: means for receiving assistance information corresponding to one or more uplink (UL) transmissions of a first user equipment (UE); means for determining a discontinuous reception (DRX) configuration for a second UE based at least in part on the assistance information, wherein the DRX configuration is indicative of a DRX on-duration for the second UE; and means for transmitting, to the second UE, information indicative of the DRX configuration.

In some aspects, the apparatuses or network devices described is, includes, or is part of, a vehicle (e.g., an automobile, truck, etc., or a component or system of an automobile, truck, etc.), a roadside unit (RSU) or other network-enabled infrastructure equipment (e.g., a network-enabled stoplight, etc.), a mobile device (e.g., a mobile telephone or so-called "smart phone" or other mobile device), a network-connected wearable device (e.g., a so-called "smart watch"), an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures.

DETAILED DESCRIPTION

Figure 1:
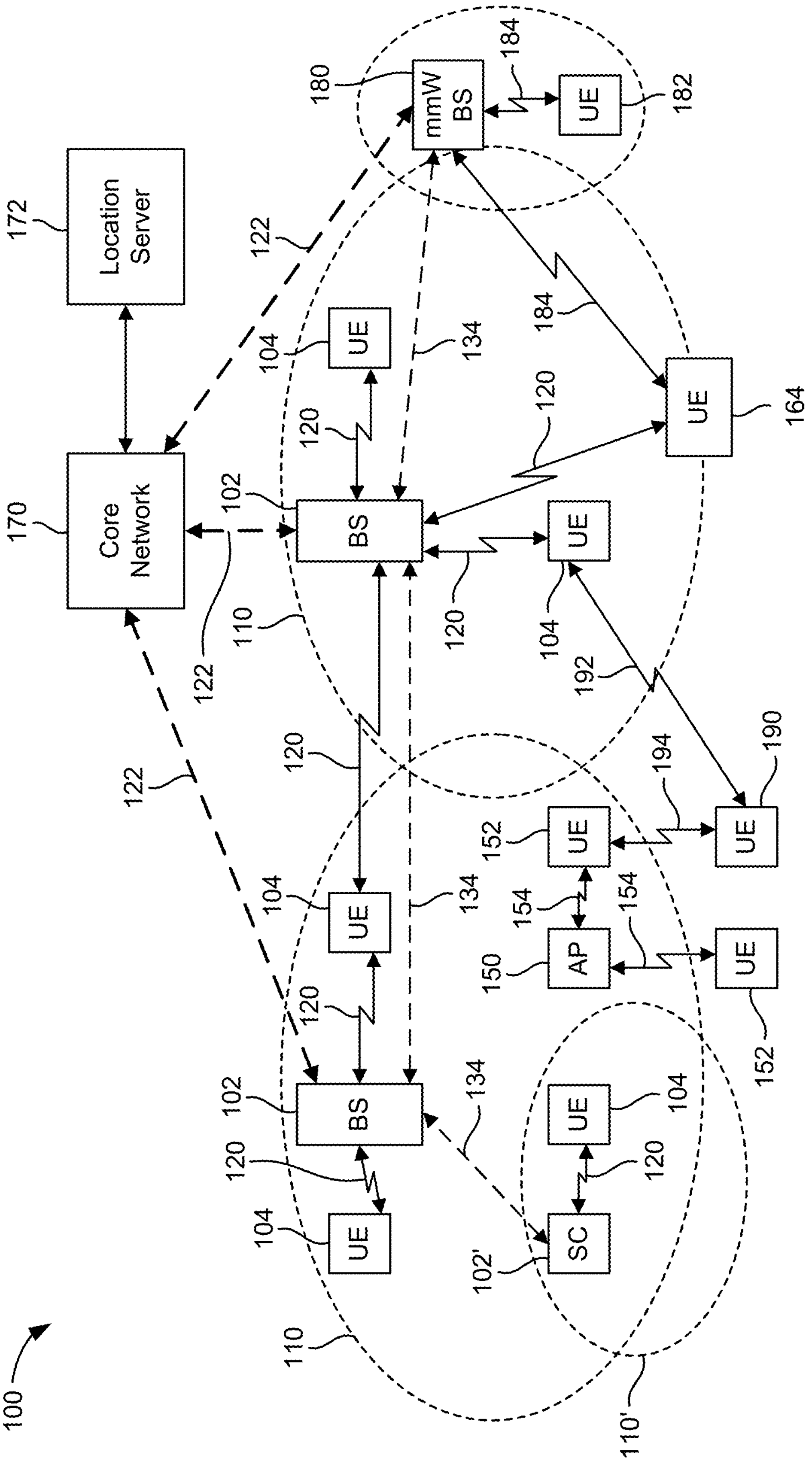
FIG. 1 is a diagram illustrating an example wireless communications system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHZ). As used herein, the term sidelink may refer to 3GPP sidelink (e.g., using a PC5 sidelink interface), Wi-Fi direct communications (e.g., according to a Dedicated Short Range Communication (DSRC) protocol), or using any other direct device-to-device communication protocol.

Vehicles are an example of systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), infrastructure-to-vehicle (I2V), vehicle-to-network (V2N), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, equipped vulnerable road users (VRUs), such as bicyclists, roadside units (RSUs), and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, VRUs, and/or traffic infrastructure. The information may be transmitted using one or more vehicle-based messages, such as cellular-vehicle-to-everything (C-V2X) messages, which can include Sensor Data Sharing Messages (SDSMs), Basic Safety Messages (BSMs), Cooperative Awareness Messages (CAMs), Collective Perception Messages (CPMs), Decentralized Environmental Messages (DENMs), a VRU Awareness message (VAM), and/or other types of vehicle-based messages. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V, V2I, and I2V communications, which can also be referred to as peer-to-peer communications. V2V, V2I, and 12V communications allow for vehicles to directly wireless communicate with each other and with V2X-capable infrastructure (e.g., a V2X-capable RSU, a V2X-capable stop light, etc.) while on the road. With V2V, V2I, and I2V communications, vehicles can gain situational awareness by receiving information regarding upcoming road dangers (e.g., unforeseen oncoming vehicles, accidents, and road conditions) from the other vehicles and/or from the V2X-capable infrastructure.

The IEEE 802.11p Standard supports (uses) a dedicated short-range communications (DSRC) interface for V2X wireless communications. Characteristics of the IEEE 802.11p based DSRC interface include low latency and the use of the unlicensed 5.9 Gigahertz (GHz) frequency band. C-V2X was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band. Vehicle-based messages, such as BSMs and CAMs, which are application layer messages, are designed to be wirelessly broadcasted over the 802.11p based DSRC interface and the LTE C-V2X sidelink PC5 interface.

Connected vehicles can refer to various vehicle UEs, including a vehicle UE configured for V2X communications (e.g., also referred to as a "V2X UE"). As noted above, a vehicle UE can be used to perform one or more of vehicle (V2V), vehicle-to-infrastructure (V2I), infrastructure-to-vehicle (I2V), vehicle-to-network (V2N), and vehicle-to-pedestrian (V2P) communications, which are all collectively referred to as vehicle-to-everything (V2X) communications.

In some cases, connected vehicles can include or otherwise be associated with a vehicle on-board unit (OBU). The OBU can be used to perform and/or handle communications between the V2X UE (e.g., the connected vehicle) and a mobile network, infrastructure network, surroundings, etc. In some examples, an OBU of a first V2X UE can be used to communicate with corresponding OBUs of various other (e.g., additional) V2X UEs, road-side units (RSUs), and/or vulnerable road users (VRUs, e.g., scooters, smartphones of pedestrians, etc.) using sidelink communications. In some cases, sidelink communications can be used to implement direct communication between V2X or V2V connected vehicles, can be used to implement direction communication between V2X or V2P connected vehicles and pedestrian UEs, etc.

In some examples, V2X sidelink communications can be implemented as Mode 1 sidelink communications, where resource allocation is performed by a base station or gNB. For instance, in Mode 1 sidelink communications, a vehicle UE (e.g., V2X UE) can receive resource grant information using a Uu link between the vehicle UE and a base station or gNB of the network. Based on the Uu resource grant information, the vehicle UE can implement PC5 or other sidelink communications with another vehicle UE, UE, etc.

In other examples, V2X sidelink communications can be implemented as Mode 2 sidelink communications, where the connected vehicles (e.g., vehicle UEs or V2X UEs, etc.) perform autonomous resource allocation. In Mode 2 sidelink communications, a vehicle UE (e.g., V2X UE) can perform sidelink communications with another vehicle UE, UE, etc., without involvement of a base station, gNB, or other network entity.

In some examples, V2X communications can be implemented using Uu links. For instance, Uu-based V2X can be an alternative to sidelink-based V2X and/or can be a complement to sidelink-based V2X. Uu-based V2X can additionally be used to deliver non-safety related traffic between vehicles (e.g., between vehicle UEs).

For instance, in Uu-based V2X, V2X traffic originated from a source UE (e.g., a source V2X UE) is transmitted to the network as a V2X uplink (UL) signal. For instance, the source V2X UE can transmit a V2X UL signal to a corresponding base station, gNB, or other network entity associated with the source V2X UE. The network entity receiving the V2X UL signal from the source V2X UE can then forward the V2X traffic (e.g., the V2X UL signal) to one or more intended receiving V2X UEs as a V2X DL signal. For instance, the one or more intended receiving V2X UEs can also be referred to as destination V2X UEs, and may be connected vehicles or other UEs that are interested in receiving V2X transmissions from the particular source V2X UE. In some aspects, a first network entity can receive a V2X UL signal from a source V2X UE, and may identify a corresponding network entity (e.g., base station, gNB, etc.) associated with each intended receiver of the V2X UL transmission. The first network entity can forward the V2X UL transmission to each of the identified corresponding network entities. Each of the corresponding network entities (e.g., also referred to as destination network entities) can receive the V2X UL transmission from the source V2X UE, forwarded from the first network entity, and may subsequently transmit the forwarded V2X UL transmission to one or more destination V2X UEs (e.g., transmitted as a V2X DL transmission).

V2X can be implemented to support various cast types and/or terminal types. For instance, V2X can be implemented to support unicast, groupcast, broadcast, etc., cast types. In some examples, V2X can be implemented for vehicle UEs (e.g., non-power limited) terminal types, pedestrian UE (e.g., power-limited) terminal types, among various other terminal types, etc.

There is a need for systems and techniques that can be used to implement V2X communications with support for different UE types (e.g., different terminal types). For instance, there is a need for systems and techniques that can be used to implement V2X communications for various different UE types for safety-based applications and/or other V2X communication exchanges associated with safety-based or safety-related information corresponding to one or more vehicle UEs (e.g., connected vehicles). For example, V2X implementations may differ for different UE types. In some examples, there is a need for V2X systems and techniques that can be implemented for vehicle UEs without power saving operations required for operation (e.g., based on an assumption that vehicle UEs can be treated as having an approximately unlimited power supply, relative to other types of power-constrained UEs, such as pedestrian UEs). There is also a need for V2X systems and techniques that can be implemented for pedestrian UEs (e.g., among various other power-constrained UEs and/or power-limited UEs).

There is a further need for systems and techniques that can be used to provide communications (e.g., V2X communications and/or other types of communications) using discontinuous reception (DRX) for receiving transmissions (e.g., V2X transmissions) in Uu DL (e.g., DRX for receiving V2X transmissions in Uu DL by pedestrian UEs and/or other power-limited UEs).

DRX can be used to configure a physical downlink communication channel (PDCCH) and/or other channels for periodic monitoring, where a UE periodically or intermittently wakes up to monitor for downlink data or transmissions during a periodic DRX-enabled state and enters a low-power sleep or idle mode outside of the periodic DRX-enabled state (e.g., during a DRX-disabled state). In some cases, DRX implemented by a UE can also be referred to as a connected mode DRX, and may be used to improve UE power consumption (e.g., battery power consumption) based on the UE periodically entering a 'sleep' state for an 'off duration' during which the UE does not monitor some (or all) communication channels available to the UE.

V2X traffic generated by a connected vehicle (e.g., vehicle UE, V2X UE, etc.) can be associated with V2X traffic characteristics that can vary based on one or more V2X applications running on or for the V2X UE. For instance, different V2X UEs may run different V2X applications, and a particular V2X UE may run multiple V2X applications. Additionally, each V2X application may be associated with and/or provide one or more different V2X services. Each V2X service can be associated with or correspond to a respective V2X transmit (Tx) profile, quality-of-service (QOS) profile, etc. Different V2X services (e.g., of different V2X applications of different V2X UEs) can correspond to different V2X Tx and/or QoS profiles. In some examples, a V2X UE may request to receive the corresponding V2X transmissions (e.g., V2X UL transmissions) for one V2X application or service. In other examples, the V2X UE may request to receive the corresponding V2X transmissions (e.g., V2X UL transmissions) for a plurality of different V2X applications and/or a plurality of different V2X services.

Systems, apparatuses, processes (also referred to as methods), and computer-readable media (collectively referred to as "systems and techniques") are described herein for discontinuous reception (DRX) for Uu-based communication (e.g., Uu-based V2X communication). In some aspects, the systems and techniques can be used to perform DRX between a plurality of UEs, where the plurality of UEs includes one or more vehicle UEs (e.g., V2X UEs). In some examples, a source UE associated with the Uu-based V2X communication is a connected vehicle (e.g., a V2X UE). In some cases, one or more destination UEs associated with the Uu-based V2X communication are power-limited UEs (e.g., such as a pedestrian UE, smartphone, mobile computing device, etc.).

A network entity (e.g., a base station, gNB, network core entity, etc.) can receive assistance information corresponding to one or more uplink (UL) transmissions of a first UE. In one illustrative example, the one or more UL transmissions are V2X transmissions of a connected vehicle (e.g., V2X UE). The network entity can determine a periodicity of the one or more UL transmissions based on the assistance information. For example, the assistance information can be indicative of one or more V2X traffic characteristics of one or more V2X UL transmissions of the connected vehicle. The one or more V2X traffic characteristics can include at least one of a V2X application identifier, a V2X service type identifier, a group identifier, a source identifier, or a destination identifier associated with the one or more V2X UL transmissions of the connected vehicle.

A discontinuous reception (DRX) configuration can be determined for a second UE based on the assistance information, where the DRX configuration is indicative of a DRX on-duration for the second UE. In some aspects, the second UE is a power-limited UE that requests to receive the corresponding V2X transmissions of the first UE. For example, the second UE can be a pedestrian UE, smartphone, mobile computing device, etc. that requests to receive V2X transmissions of a particular V2X UE. In another example, the second UE can be another connected vehicle (e.g., V2X UE) that requests to receive V2X transmissions of a particular V2X UE. For instance, the second V2X UE can request V2X transmissions of the first V2X UE to perform platooning, etc.

In one illustrative example, the assistance information can be received by a first network entity associated with the first V2X UE and the DRX configuration can be determined by a second network entity associated with the second V2X UE (e.g., based on the second network entity receiving the assistance information from the first network entity). In another example, the same network entity can receive the assistance information from the first V2X UE, can determine the DRX configuration based on the assistance information, and/or can transmit the DRX configuration to the second V2X UE.

In some aspects, the assistance information can be used to determine the DRX configuration, as noted above. For instance, a periodicity of the one or more V2X UL transmissions from the first V2X UE can be determined based on the assistance information (e.g., based on the assistance information including and/or being indicative of one or more V2X traffic characteristics of the first V2X UE). Based on the determined periodicity of the one or more V2X UL transmissions, the DRX on-duration corresponding to the DRX configuration can be aligned with the periodicity of the one or more V2X UL transmissions. For example, a destination (e.g., receiving) UE configured with the DRX configuration will be active to receive DL transmissions from the network during the DRX on-duration. Outside of the DRX on-duration (e.g., during the DRX off-duration), the destination UE may be inactive and/or in a low-power mode and not able to receive V2X DL transmissions forwarded by the network (e.g., forwarded from a source V2X UE). In some aspects, the DRX configuration can be determined to align the receive periodicity of one or more destination UEs with the transmit periodicity of a source V2X UE, where the destination UEs have requested or subscribed to V2X transmissions from the source V2X UE.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), a network-connected wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mm W or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
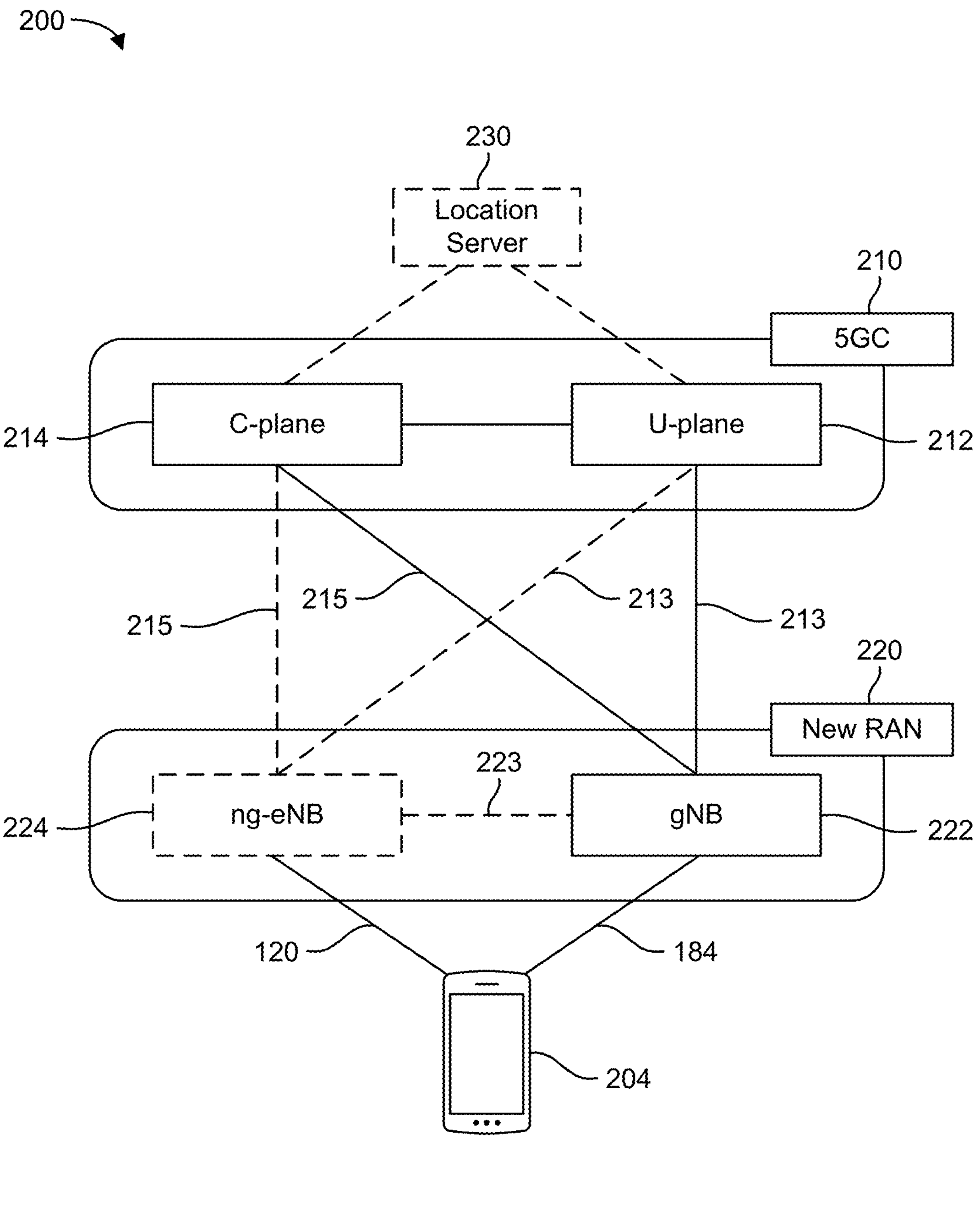
FIG. 2A and FIG. 2B illustrate examples of wireless network structures, in accordance with some examples.

According to various aspects, FIG. 2A illustrates an example wireless network structure 200. For example, a 5GC 210 (also referred to as a Next Generation Core (NGC)) may be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

In some aspects, wireless network structure 200 may include location server 230, which may be in communication with the 5GC 210 to provide location assistance for UEs 204. The location server 230 may be implemented as a plurality of separate servers (e.g., physically separate servers, different software modules on a single server, different software modules spread across multiple physical servers, etc.), or alternately may each correspond to a single server. The location server 230 may be configured to support one or more location services for UEs 204 that may connect to the location server 230 via the core network, 5GC 210, and/or via the Internet (not illustrated). Further, the location server 230 may be integrated into a component of the core network, or alternatively may be external to the core network. In some examples, the location server 230 may be operated by a carrier or provider of the 5GC 210, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

Figure 2B:
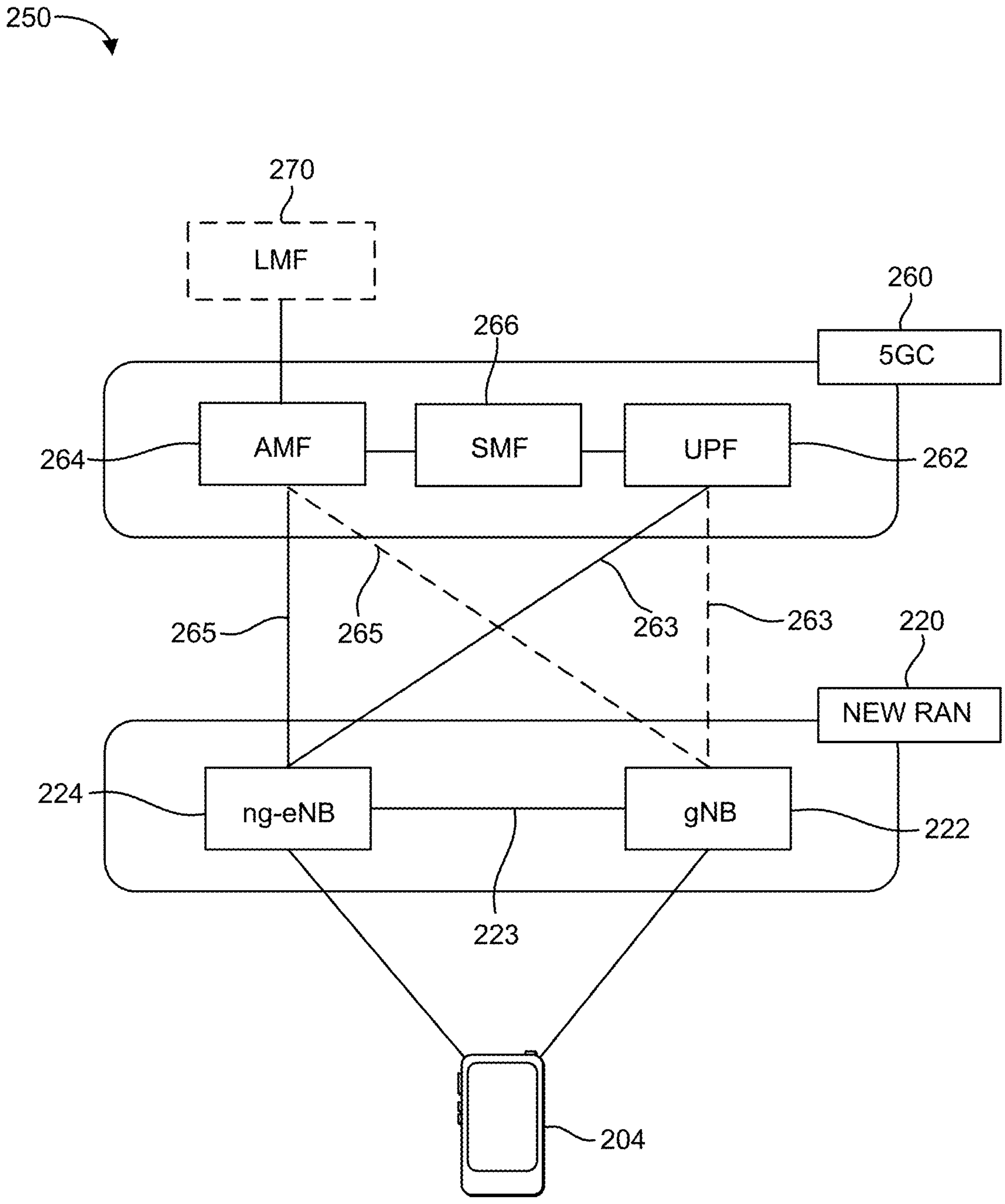

According to various aspects, FIG. 2B illustrates another example wireless network structure 250. In some examples, 5GC 260 may be viewed functionally as control plane functions, provided by an access and mobility management function (AMF) 264, and user plane functions, provided by a user plane function (UPF) 262, which operate cooperatively to form the core network (e.g., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 may also interact with an authentication server function (AUSF) (not shown) and the UE 204, and may receive an intermediate key established as a result of the UE 204 authentication process.

In the case of authentication based on a UMTS (universal mobile telecommunications system) subscriber identity module (USIM), the AMF 264 may retrieve the security material from the AUSF. The functions of the AMF 264 may also include security context management (SCM). The SCM may receive a key from the SEAF that it may use to derive access-network specific keys. The functionality of the AMF 264 may also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP), not shown in FIG. 2B.

In some examples, the functions of SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 may be referred to as the N11 interface.

In some aspects, wireless network structure 250 may include an LMF 270, which may be in communication with the 5GC 260 to provide location assistance for UEs 204. The LMF 270 may be implemented as a plurality of separate servers (e.g., physically separate servers, different software modules on a single server, different software modules spread across multiple physical servers, etc.), or alternately may each correspond to a single server. The LMF 270 may be configured to support one or more location services for UEs 204 that may connect to the LMF 270 via the core network, 5GC 260, and/or via the Internet (not illustrated). The SLP may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP may communicate with UEs 204 and external clients (not shown in FIG. 2B) over a user plane (e.g., using protocols intended to carry voice and/or data like the transmission control protocol (TCP) and/or IP).

In some cases, LMF 270 and/or the SLP may be integrated with a base station, such as the gNB 222 and/or the ng-eNB 224. When integrated with the gNB 222 and/or the ng-eNB 224, the LMF 270 and/or the SLP may be referred to as a "location management component," or "LMC." As used herein, references to LMF 270 and SLP include both the case in which the LMF 270 and the SLP are components of the core network (e.g., 5GC 260) and the case in which the LMF 270 and the SLP are components of a base station.

As described above, wireless communications systems support communication among multiple UEs. In various examples, wireless communications systems may be configured to support device-to-device (D2D) communication and/or vehicle-to-everything (V2X) communication. V2X may also be referred to as Cellular V2X (C-V2X). V2X communications may be performed using any radio access technology, such as LTE, 5G, WLAN, or other communication protocol. In some examples, UEs may transmit and receive V2X messages to and from other UEs, road side units (RSUs), and/or other devices over a direct communications link or interface (e.g., a PC5 or sidelink interface, an 802.11p DSRC interface, and/or other communications interface) and/or via the network (e.g., an eNB, a WiFi AP, and/or other network entity). The communications may be performed using resources assigned by the network (e.g., an eNB or other network device), resources pre-configured for V2X use, and/or using resources determined by the UEs (e.g., using clear channel assessment (CCA) with respect to resources of an 802.11 network).

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 360° non line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHZ), the U-NII-5 band (5.925-6.425 GHz), the U-NII-6 band (6.425-6.525 GHZ), the U-NII-7 band (6.525-6.875 GHZ), the U-NII-8 band (6.875-7.125 GHZ), or any other frequency band that may be suitable for performing sidelink communications.

Figure 2C:
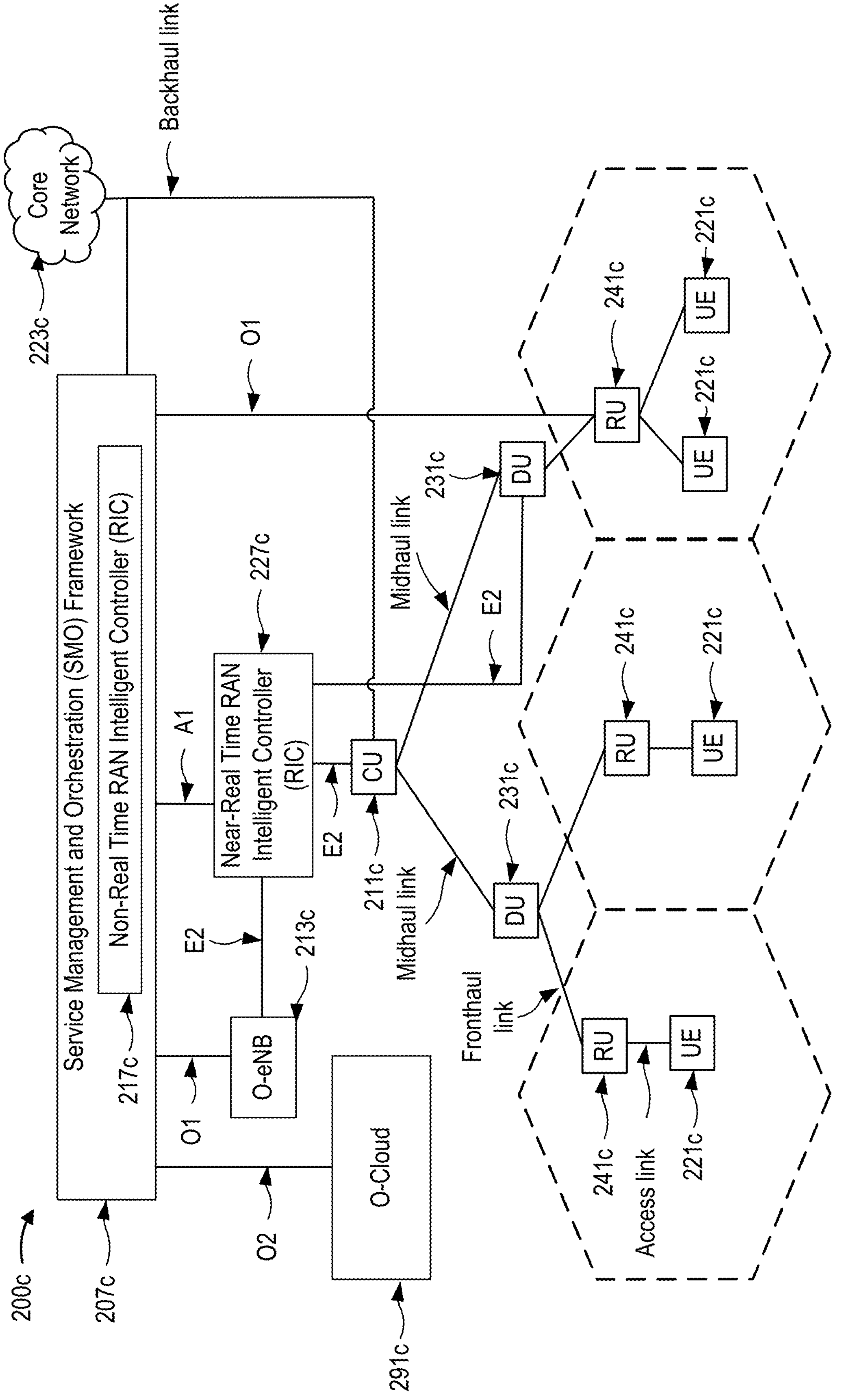
FIG. 2C is a diagram illustrating an example of a disaggregated base station architecture, in accordance with some examples.

FIG. 2C is a diagram illustrating an example of a disaggregated base station architecture, which may be employed by the disclosed system for enhanced VRU prediction through server-based processing (e.g., cloud-based processing using one or more servers), in accordance with some examples. Deployment of communication systems, such as 5G NR systems, may be arranged in multiple manners with various components or constituent parts.

In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, e.g., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2C shows a diagram illustrating an example disaggregated base station 200*c* architecture. The disaggregated base station 200*c* architecture may include one or more central units (CUs) 211*c* that can communicate directly with a core network 223*c* via a backhaul link, or indirectly with the core network 223*c* through one or more disaggregated base station units (such as a Near-Real Time (Near-RT) RAN Intelligent Controller (RIC) 227*c* via an E2 link, or a Non-Real Time (Non-RT) RIC 217 associated with a Service Management and Orchestration (SMO) Framework 207*c*, or both). A CU 211*c* may communicate with one or more distributed units (DUs) 231*c* via respective midhaul links, such as an F1 interface. The DUs 231*c* may communicate with one or more radio units (RUS) 241*c* via respective fronthaul links. The RUs 241*c* may communicate with respective UEs 221*c* via one or more RF access links. In some implementations, the UE 221*c* may be simultaneously served by multiple RUs 241*c*.

Each of the units, e.g., the CUS 211*c*, the DUs 231*c*, the RUs 241*c*, as well as the Near-RT RICs 227*c*, the Non-RT RICs 217*c* and the SMO Framework 207*c*, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211*c* may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211*c*. The CU 211*c* may be configured to handle user plane functionality (e.g., Central Unit-User Plane (CU-UP)), control plane functionality (e.g., Central Unit-Control Plane (CU-CP)), or a combination thereof. In some implementations, the CU 211*c* can be logically split into one or more CU-UP units and one or more CU-CP units. The CU-UP unit can communicate bidirectionally with the CU-CP unit via an interface, such as the E1 interface when implemented in an O-RAN configuration. The CU 211*c* can be implemented to communicate with the DU 131*c*, as necessary, for network control and signaling.

The DU 231*c* may correspond to a logical unit that includes one or more base station functions to control the operation of one or more RUs 241*c*. In some aspects, the DU 231*c* may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 231*c* may further host one or more low PHY layers. Each layer (or module) can be implemented with an interface configured to communicate signals with other layers (and modules) hosted by the DU 231*c*, or with the control functions hosted by the CU 211*c*.

Lower-layer functionality can be implemented by one or more RUs 241*c*. In some deployments, an RU 241*c*, controlled by a DU 231*c*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241*c* can be implemented to handle over the air (OTA) communication with one or more UEs 221*c*. In some implementations, real-time and non-real-time aspects of control and user plane communication with the RU(s) 241*c* can be controlled by the corresponding DU 231*c*. In some scenarios, this configuration can enable the DU(s) 231*c* and the CU 211*c* to be implemented in a server-based (e.g., cloud-based) RAN architecture, such as a vRAN architecture.

The SMO Framework 207*c* may be configured to support RAN deployment and provisioning of non-virtualized and virtualized network elements. For non-virtualized network elements, the SMO Framework 207*c* may be configured to support the deployment of dedicated physical resources for RAN coverage requirements which may be managed via an operations and maintenance interface (such as an O1 interface). For virtualized network elements, the SMO Framework 207*c* may be configured to interact with a cloud computing platform (such as an open cloud (O-Cloud) 291*c*) to perform network element life cycle management (such as to instantiate virtualized network elements) via a cloud computing platform interface (such as an O2 interface). Such virtualized network elements can include, but are not limited to, CUs 211*c*, DUs 231*c*, RUs 241*c* and Near-RT RICs 227*c*. In some implementations, the SMO Framework 207*c* can communicate with a hardware aspect of a 4G RAN, such as an open eNB (O-eNB) 213*c*, via an O1 interface. Additionally, in some implementations, the SMO Framework 207*c* can communicate directly with one or more RUs 241*c* via an O1 interface. The SMO Framework 207*c* also may include a Non-RT RIC 217*c* configured to support functionality of the SMO Framework 207*c*.

The Non-RT RIC 217*c* may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227*c*. The Non-RT RIC 217*c* may be coupled to or communicate with (such as via an A1 interface) the Near-RT RIC 227*c*. The Near-RT RIC 227*c* may be configured to include a logical function that enables near-real-time control and optimization of RAN elements and resources via data collection and actions over an interface (such as via an E2 interface) connecting one or more CUs 211*c*, one or more DUs 231*c*, or both, as well as an O-eNB 213*c*, with the Near-RT RIC 227*c*.

In some implementations, to generate AI/ML models to be deployed in the Near-RT RIC 227*c*, the Non-RT RIC 217*c* may receive parameters or external enrichment information from external servers. Such information may be utilized by the Near-RT RIC 227*c* and may be received at the SMO Framework 207*c* or the Non-RT RIC 217*c* from non-network data sources or from network functions. In some examples, the Non-RT RIC 217*c* or the Near-RT RIC 227*c* may be configured to tune RAN behavior or performance. For example, the Non-RT RIC 217*c* may monitor long-term trends and patterns for performance and employ AI/ML models to perform corrective actions through the SMO Framework 207*c* (such as reconfiguration via 01) or via creation of RAN management policies (such as A1 policies).

Figure 3:
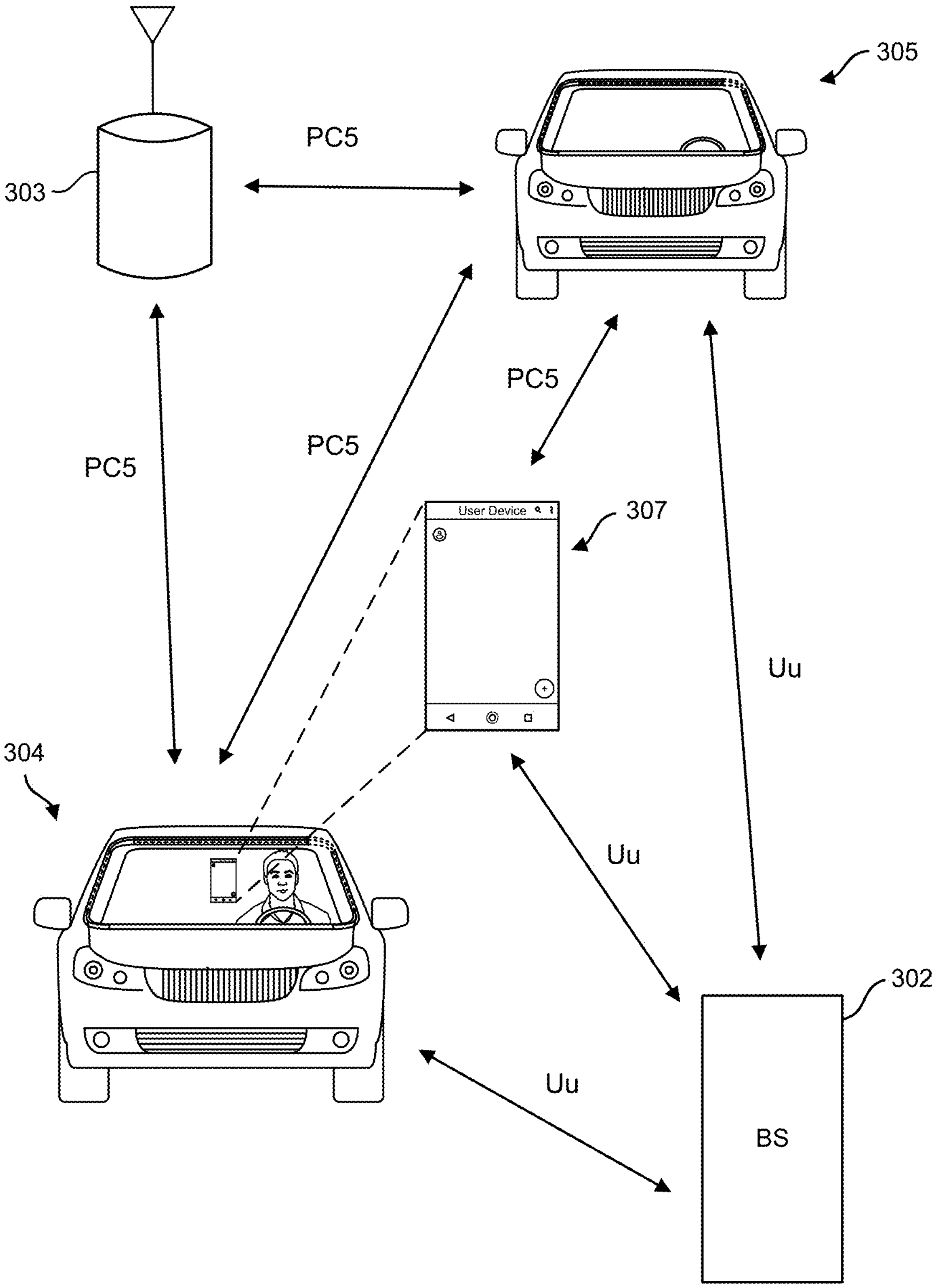
FIG. 3 is a diagram illustrating an example of various user equipment (UEs) communicating over direct communication interfaces (e.g., a cellular based PC5 sidelink interface, 802.11p defined DSRC interface, or other direct interface) and wide area network (Uu) interfaces, in accordance with some examples.

FIG. 3 illustrates examples of different communication mechanisms used by various UEs. In one example of sidelink communications, FIG. 3 illustrates a vehicle 304, a vehicle 305, and an RSU 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface (or other device to device direct interface, such as a DSRC interface), as shown in FIG. 3.

While FIG. 3 illustrates a particular number of vehicles (e.g., two vehicles 304 and 305) communicating with each other and/or with RSU 303, BS 302, and/or user device 307, the present disclosure is not limited thereto. For instance, tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
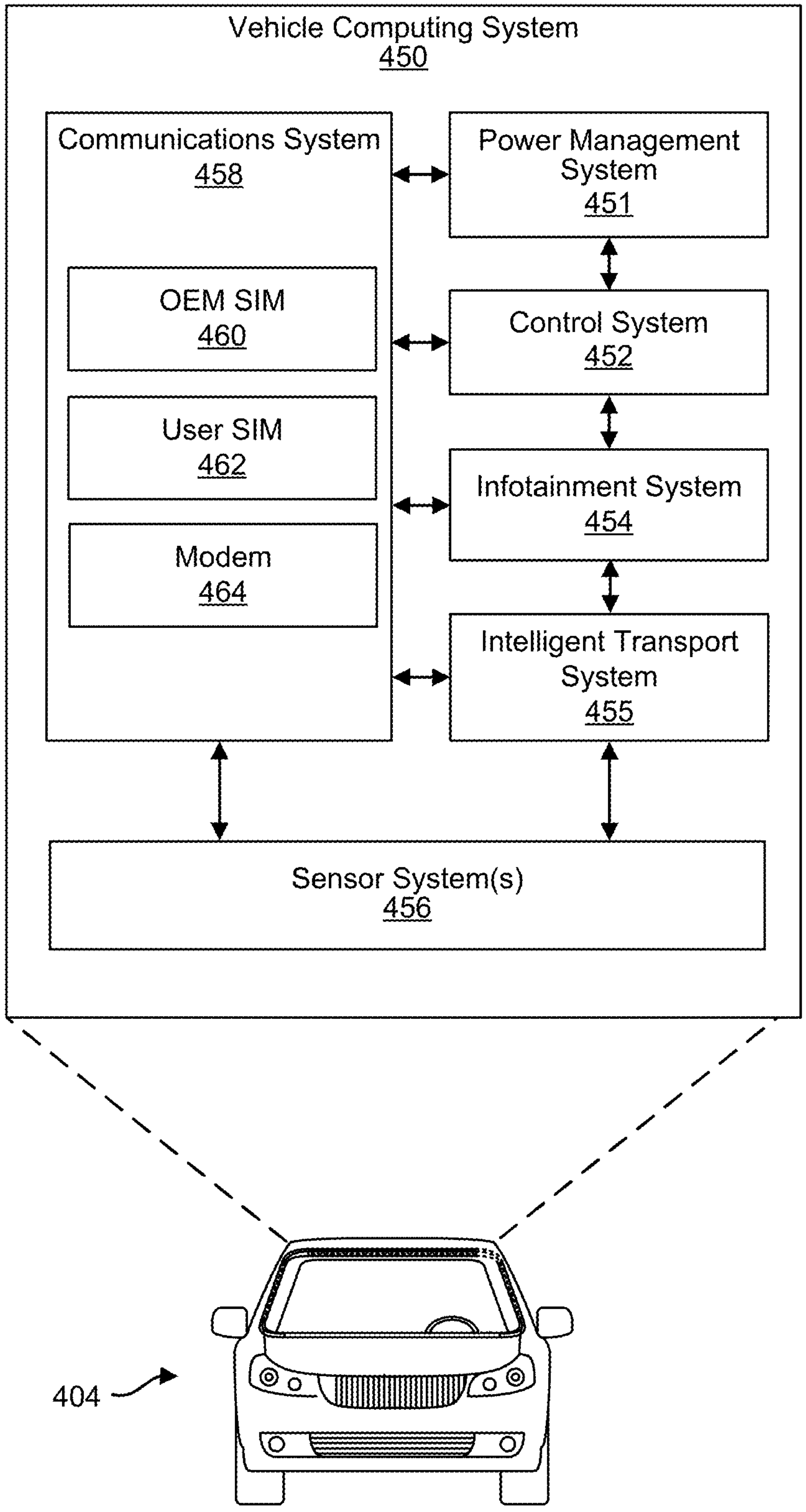
FIG. 4 is a block diagram illustrating an example of a computing system of a vehicle, in accordance with some examples.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUS), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., “9-1-1” in the United States, “1-1-2” in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFi™ (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 can include the intelligent transport system (ITS) 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. One or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. A thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than 0). When including multiple sensor systems, the sensor system(s) 456 can include different types of sensor systems that can be arranged on or in different parts the vehicle 404. The sensor system(s) 456 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450 can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
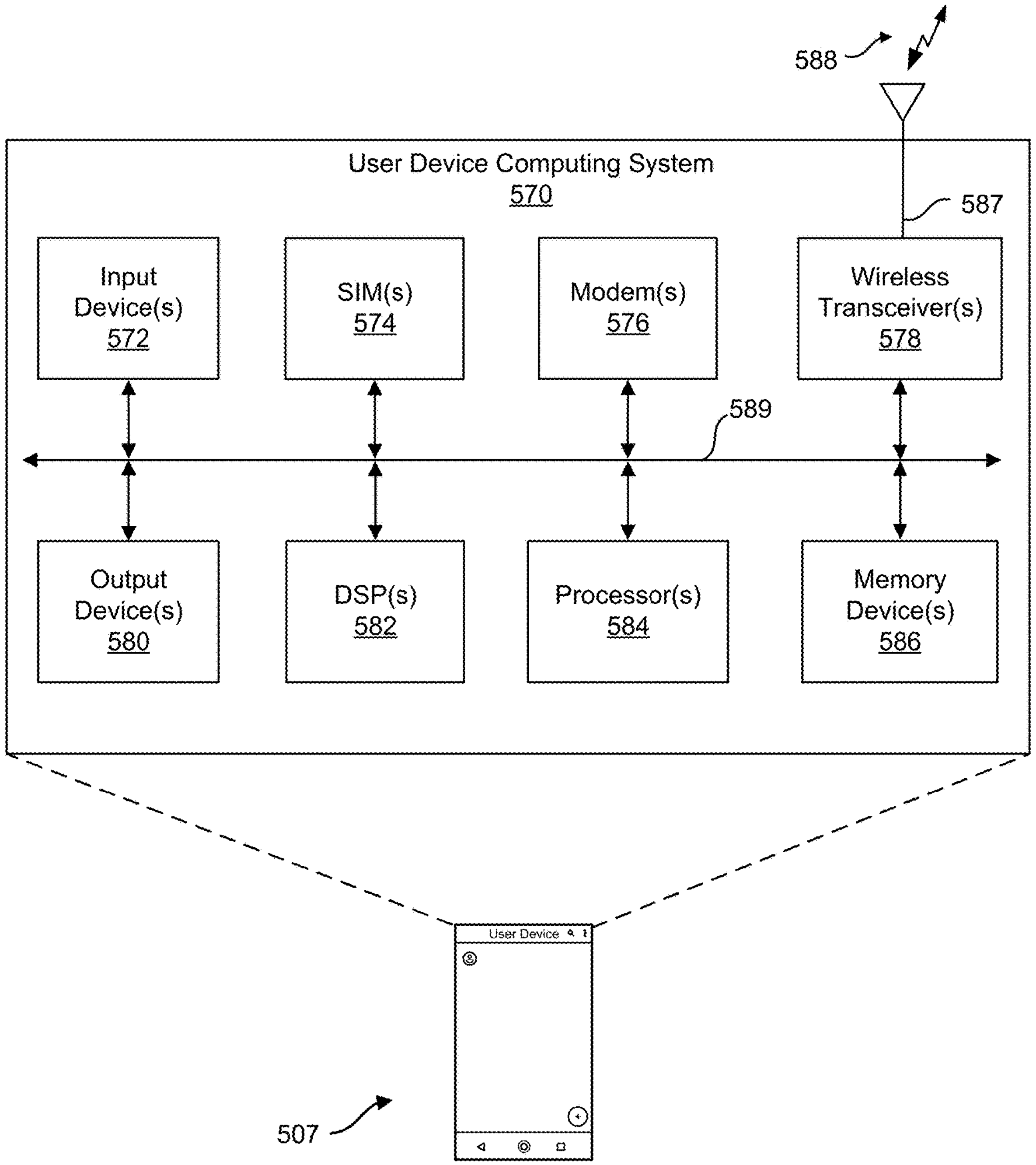
FIG. 5 is a block diagram illustrating an example of a computing system of a user device, in accordance with some examples.

FIG. 5 illustrates an example of a computing system 570 of a user device 507. The user device 507 is an example of a UE that can be used by an end-user. For example, the user device 507 can include a mobile phone, router, tablet computer, laptop computer, tracking device, a network-connected wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICS, FPGAs, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFi routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 6:
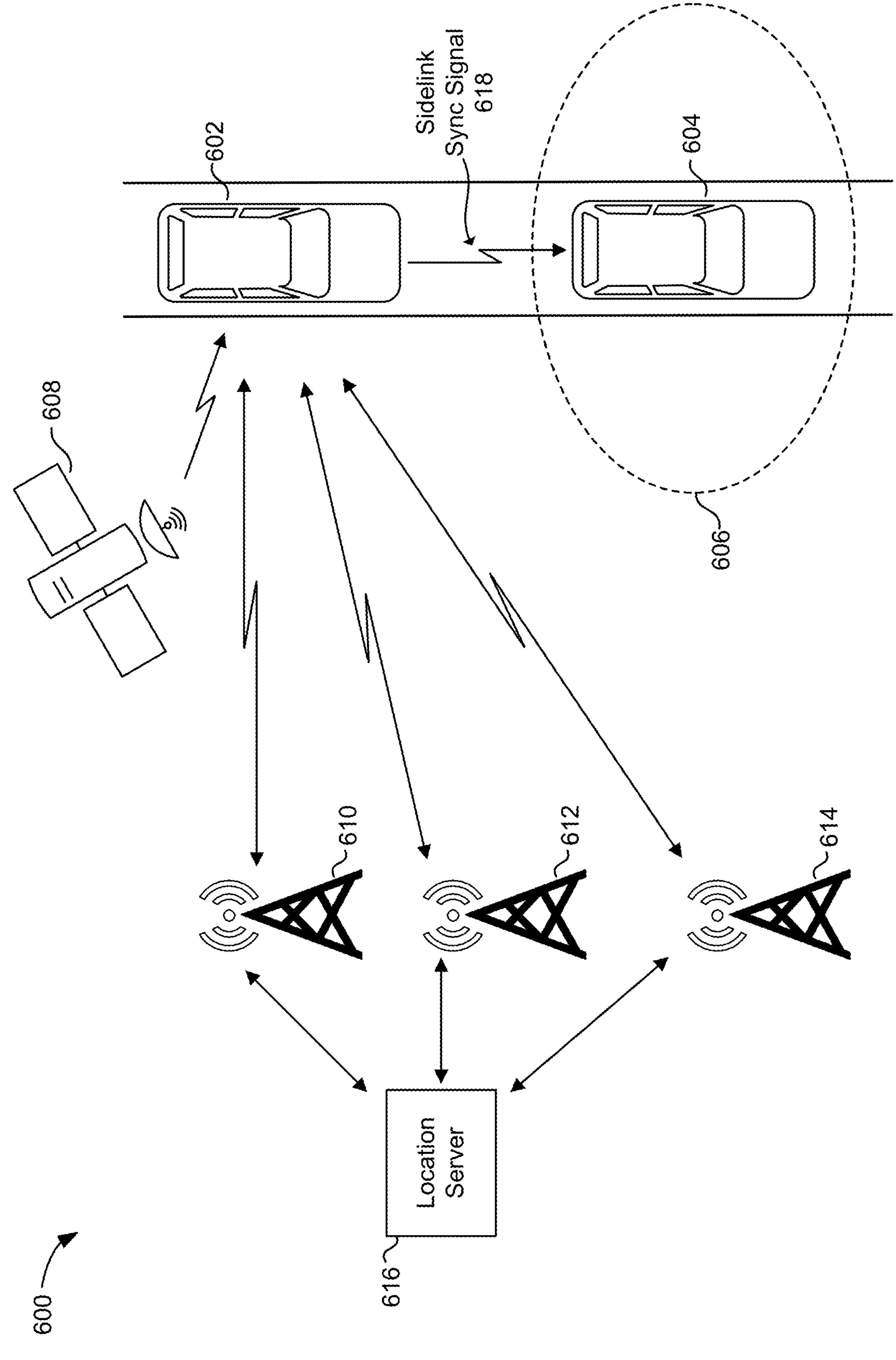
FIG. 6 is a diagram illustrating an example wireless communications system for implementing UE sidelink synchronization, in accordance with some examples.

FIG. 6 is a diagram illustrating an example wireless communications system 600 for configuring transmission of a sidelink synchronization signal by a wireless device. In some aspects, the system 600 may include one or more user equipment (UE) devices such as UE 602 and UE 604. As noted above, a UE device (e.g., UE 602 and/or UE 604) may include any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network.

In some examples, system 600 may include one or more base stations. For instance, system 600 can include base station 610, base station 612, and base station 614. In some cases, base station 610, base station 612, and/or base station 614 can be associated with UE 602 (e.g., UE 602 may communicate with base station 610 using a network (Uu) interface). In some aspects, one or more of the base stations (e.g., base station 610, base station 612, and/or base station 614) can communicate with location server 616 (e.g., configured to implement LMF 270).

In some cases, UE 602 and UE 604 can be configured to communicate using sidelink communications (e.g., PC5, DSRC, and/or Uu-based sidelink communications, etc.). In some aspects, a UE that receives a sidelink communication (e.g., UE 602 and/or UE 604) can use a sidelink synchronization signal (SLSS) to synchronize to the transmitting UE to properly demodulate and/or decode received data. In some cases, the SLSS can include a primary sidelink synchronization signal (P-SSS) and/or a secondary sidelink synchronization signal (S-SSS). In some aspects, SLSS (e.g., the P-SSS and/or the S-SSS) can be included in a sidelink synchronization signal block (S-SSB). In some examples, the S-SSB can be transmitted as part of a Physical Sidelink Broadcast Channel (PSBCH).

In some cases, the source of the SLSS for a UE device can be a Global Navigation Satellite System (GNSS) signal, a base station signal, a signal from another UE, and/or an internal clock signal (e.g., clock generated by the UE device. In some examples, UE 602 may prioritize using the GNSS signal received from satellite 608 as the source of the SLSS. In some aspects, if a GNSS signal is not available, UE 602 may utilize a downlink signal from a base station (e.g., base station 610, base station 612, and/or base station 614) as the source of the SLSS. In some examples, if UE 602 cannot receive a GNSS signal or a base station signal, UE 602 may utilize a signal from another UE as the source of the SLSS. In some cases, if no external source (e.g., GNSS satellite, base station, or other UE) for the SLSS is available, UE 602 may utilize an internal clock as the source of the SLSS.

In some cases, a UE device may be located within a geographic area where the UE device is unable to receive a GNSS signal and/or a base station signal for use as a sidelink synchronization source. As illustrated, UE 604 is located within shielded geographic area 606. In some cases, shielded geographic area 606 may correspond to a geographic area in which GNSS signal quality and/or base station signal quality is deficient (e.g., not accessible or below a threshold signal quality). Illustrative examples of shielded geographic area 606 can include a tunnel, an urban canyon, a forest, a parking garage, and/or any other geographic area in which GNSS signal quality and/or base station signal quality is deficient.

In some examples, a base station (e.g., base station 610, base station 612, and/or base station 614) can instruct UE 602 to transmit SLSS 618 based the location of UE 602 relative to shielded geographic area 606. For example, location server 616 (e.g., LMF 270) can calculate the position of UE 602 (e.g., based on positioning reference signals, UL/DL measurements, etc.). In some cases, location server 616 can determine the position of UE 602 within 50 meters (m) of accuracy. In some aspects, location server 616 can determine the position of UE 602 within 10 m of accuracy.

In some aspects, location server 616 can send the location data associated with UE 602 to one or more base stations that are in proximity of shielded geographic area 606. In some cases, a base station can use the location data to determine that UE 602 is in close proximity to shielded geographic area 606. For example, location server 616 can send the location of UE 602 to base station 614 and base station 614 can use the location data to determine the proximity of UE 602 to shielded geographic area 606. In some cases, base station 614 can instruct UE 602 to transmit SLSS 618 when UE 602 is near shielded geographic area 606. In some example, base station 614 can instruct UE 602 to transmit SLSS 618 when UE 602 is within a threshold distance of shielded geographic area 606. For instance, base station 614 can instruct UE 602 to transmit SLSS 618 when UE 602 is within 1000 m of shielded geographic area 606.

In some examples, the location server 616 may use the position of UE 602 to determine a location of UE 602 on a map. For example, location server 616 may access map data and determine the proximity of UE 602 to shielded geographic area 606. In some cases, location server 616 may send a message to a base station (e.g., base station 614) to instruct UE 602 to transmit SLSS 618. In some aspects, multi-access edge computing (MEC) may be used to implement UE device location functions (e.g., performed by LMF 270). In some configurations, MEC can be utilized to reduce latency in signaling a UE device to transmit a sidelink synchronization signal.

In some aspects, a base station (e.g., base station 610, base station 612, and/or base station 614) can instruct UE 602 to transmit SLSS 618 based on a geofence configuration corresponding to geographic areas associated with poor signal quality (e.g., shielded geographic area 606). For example, base station 614 can instruct UE 602 to transmit SLSS 618 based on a proximity to shielded geographic area 606 (e.g., based on the location of base station 614). In some examples, a base station may instruct all associated UE devices to transmit a sidelink synchronization signal. In some cases, a base station may instruct all associated UE devices within a zone or region to transmit a sidelink synchronization signal. In some instances, a base station may use UE location data (e.g., received from location server 616) to select UE devices that are to transmit a sidelink synchronization signal. In some cases, a geofence configuration of shielded geographic area 606 can be based on a cell identifier. For instance, a footprint or geofence corresponding to shielded geographic area 606 can correspond to one or more base station identifiers corresponding to base station 610, base station 612, and/or base station 614. In some aspects, the identifier(s) associated with a geofence may include a physical cell identifier (PCI), a virtual cell identifier (VCI), and/or a cell global identifier (CGI). In some cases, the base station identifiers for implementing geofencing of shielded geographic area 606 can be based on cell handover and/or cell reselection configurations. In some aspects, base station geofencing (e.g., to identify shielded geographic area 606) can be configured per network operator (e.g., configured per public land mobile network (PLMN)).

In some examples, UE 602 and UE 604 may use sidelink communications to associate and form a UE platoon (e.g., a cluster of associated UE devices). In some cases, a UE platoon can include a platoon leader that is configured to transmit a sidelink synchronization signal to the UE devices in the UE platoon. In some examples, UE devices in a UE platoon may designate a platoon leader based on a position of the UE devices within the platoon. In some cases, the platoon leader (e.g., sidelink synchronization source for the platoon) may be selected to be the last UE device in the platoon to lose GNSS and/or base station connectivity (e.g., UE device at back of platoon). In one illustrative example, UE 602 can be designated as the platoon leader configured to transmit SLSS 618 based on the position of UE 602 at the back of the platoon (e.g., UE 602 will enter shielded geographic area 606 after UE 604).

In some aspects, UE 602 and/or UE 604 may initiate formation of a UE platoon in anticipation of entering shielded geographic area 606. In some examples, two or more UE devices may form a UE platoon based on parameters that can include UE locality (e.g., distance between UE devices), direction of travel, lane position (e.g., UE devices in same lane or adjacent lanes), speed of travel, UE capability (e.g., UE sidelink configuration, UE capability to propagate SLSS, UE capability to be configured as independent SLSS source, etc.), and/or any other UE parameter, attribute, or metric.

Figure 7A:
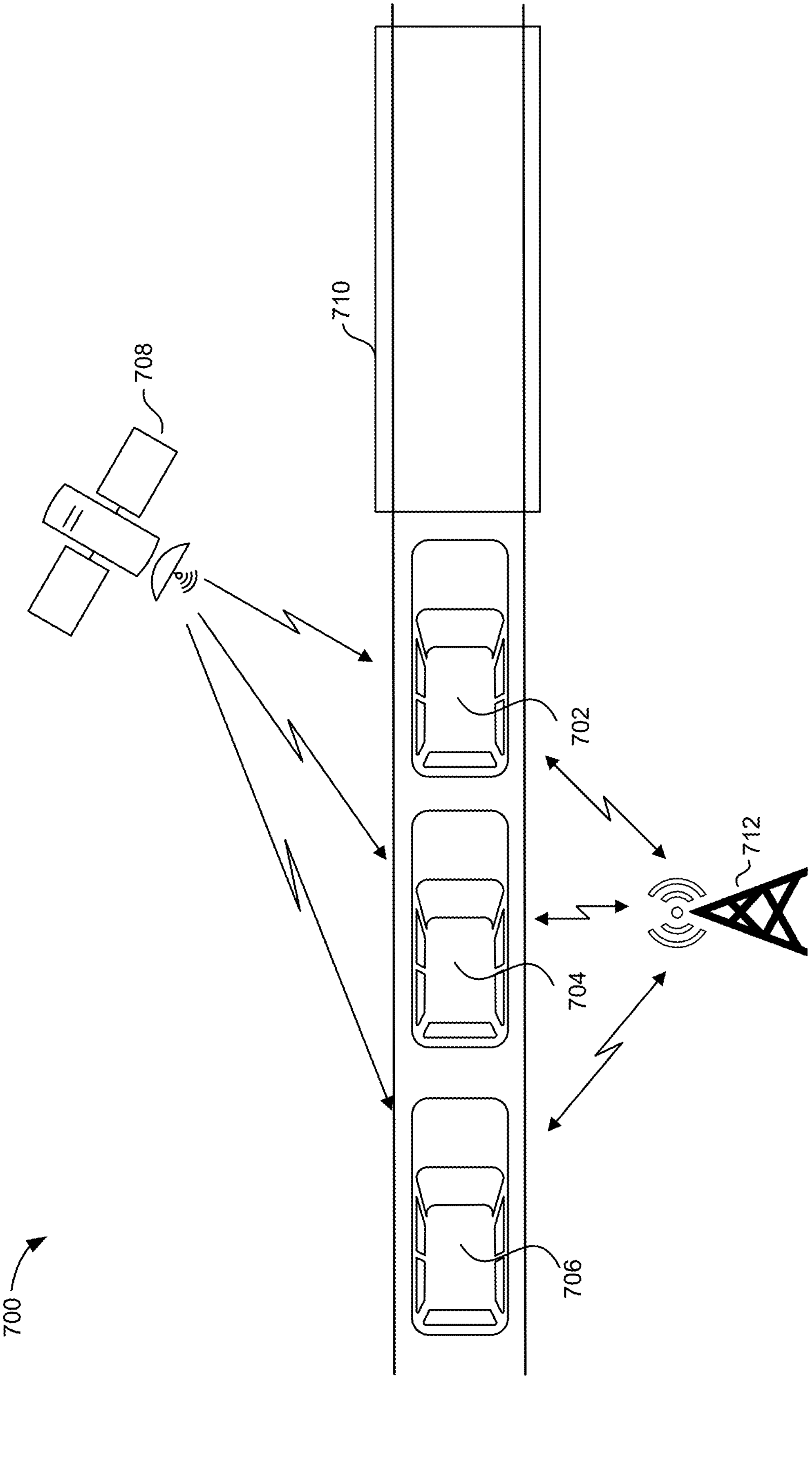
FIGS. 7A-7B illustrate example configurations for implementing a UE platoon for sidelink synchronization, in accordance with some examples.

FIG. 7A illustrates a system 700 that can be used to implementing a UE platoon for synchronizing sidelink communications. In some examples, system 700 can include UE 702, UE 704, and UE 706 that can each receive a GNSS signal from satellite 708. In some aspects, the GNSS signal from satellite 708 can be used as a sidelink synchronization signal (SLSS). In some examples, UE 702, UE 704, and UE 706 can communicate using sidelink communications and use the GNSS signal from satellite 708 as a SLSS to demodulate received data. In some cases, each UE device (e.g., UE 702, UE 704, and UE 706) in system 700 can be associated with base station 712.

In some aspects, system 700 can include a tunnel 710 that is associated with a deficient GNSS signal and/or a deficient base station signal. In some examples, tunnel 710 can correspond to any shielded geographic area (e.g., parking garage, urban canyon, forest, etc.) in which a UE device may not receive a suitable GNSS signal and/or a suitable base station signal. In some cases, UE 702 may initiate formation of a UE platoon prior to entering tunnel 710. In some examples, UE 702 can send a sidelink communication to UE 704 and/or UE 706 to initiate formation of a UE platoon. In some aspects, UE 702, UE 704, and UE 706 may form a UE platoon based on parameters that can include UE locality (e.g., distance between UE devices), direction of travel, lane position, speed of travel, and/or UE capability. For example, UE 702, UE 704, and UE 706 can form a UE platoon in response to determining that each of the respective UE devices is travelling in a same traffic lane. In another example, UE 702, UE 704, and UE 706 can form a UE platoon in response to determining that each of the respective UE devices is travelling within 5 miles-per-hour (mph) of each other. In another example, UE 702, UE 704, and UE 706 can form a UE platoon in response to determining that each of the respective UE devices is within 50 m of each other. In another example, UE 702, UE 704, and UE 706 can form a UE platoon in response to determining that each of the respective UE devices has the capability to be configured as a sidelink synchronization signal source.

In some aspects, UE 702, UE 704, and UE 706 can send sidelink communications to determine the respective position of each UE device within the UE platoon. For example, UE 702 can be identified as the "head" of the UE platoon and UE 706 can be identified as the "tail" of the UE platoon. In some cases, the position of a UE device within the UE platoon can be used to determine a platoon leader. In some instances, the platoon leader can correspond to the UE device that will transmit the sidelink synchronization signal (e.g., the UE device that will be configured as the sidelink synchronization source).

In some cases, the platoon leader (e.g., sidelink synchronization source for the platoon) may be selected to be the last UE device in the platoon to lose GNSS and/or base station connectivity (e.g., UE device at back of platoon). In one illustrative example, UE 706 can be designated as the platoon leader configured to transmit a sidelink synchronization signal to UE 702 and UE 704 based on the position of UE 706 at the back of the platoon (e.g., UE 706 will be last to enter tunnel 710). In another example, the platoon leader may be selected to be a UE device that is in the center of the UE platoon. For instance, UE 704 can be selected as the platoon leader in order to minimize the transmission distance of the sidelink synchronization signal (e.g., from UE 704 to UE 706 and from UE 704 to UE 702).

In some cases, the designation of the platoon leader can be changed dynamically based on a change in the relative positions of the UE devices. For instance, UE 704 can be designated as the platoon leader if UE 704 positioned as the last device in the UE platoon (e.g., UE 704 is passed by UE 706 prior to entering tunnel 710). In another example, UE 702 can be designated as the platoon leader if UE 702 is passed by UE 704 and UE 706 prior to entering tunnel 710. In some examples, UE devices may join or leave the UE platoon at different times. In some cases, changes in the makeup of the UE platoon may result in a change of the platoon leader.

In some aspects, the formation of the UE platoon (e.g., arrangement and/or positioning of UE devices within the UE platoon) can be configured based on factors such as the number of UE devices in the UE platoon, the number of traffic lanes, the length of the tunnel, etc. For example, a UE platoon that includes six UE devices can have a 6×1 formation (e.g., six vehicles in one lane) or a 3×2 formation (e.g., three vehicles in each of two parallel lanes). In some examples, the formation of the UE platoon can be configured to provide efficient clustering of UE devices in the UE platoon. In some cases, efficient clustering of UE devices can correspond to a platoon formation where the UE devices are in closer proximity of each other. In some examples, efficient clustering of UE devices can correspond to a platoon formation that minimizes the transmission distance between the platoon leader (e.g., transmitting the sidelink synchronization signal) and the UE device that is furthest from the platoon leader.

In some aspects, the formation of the UE platoon can be configured based on the length of a tunnel. For example, the length of a column (e.g., UE devices in a line in the direction of travel) in the UE platoon can be relative to the length of the tunnel (e.g., a shorter tunnel can correspond to a shorter column length). In some examples, the formation of the UE platoon can be dynamically updated. For instance, the formation of the UE platoon may change based on a change in the number of UE devices in the UE platoon, a change in the number of traffic lanes available, traffic conditions, transmission signal quality, etc.

Figure 7B:
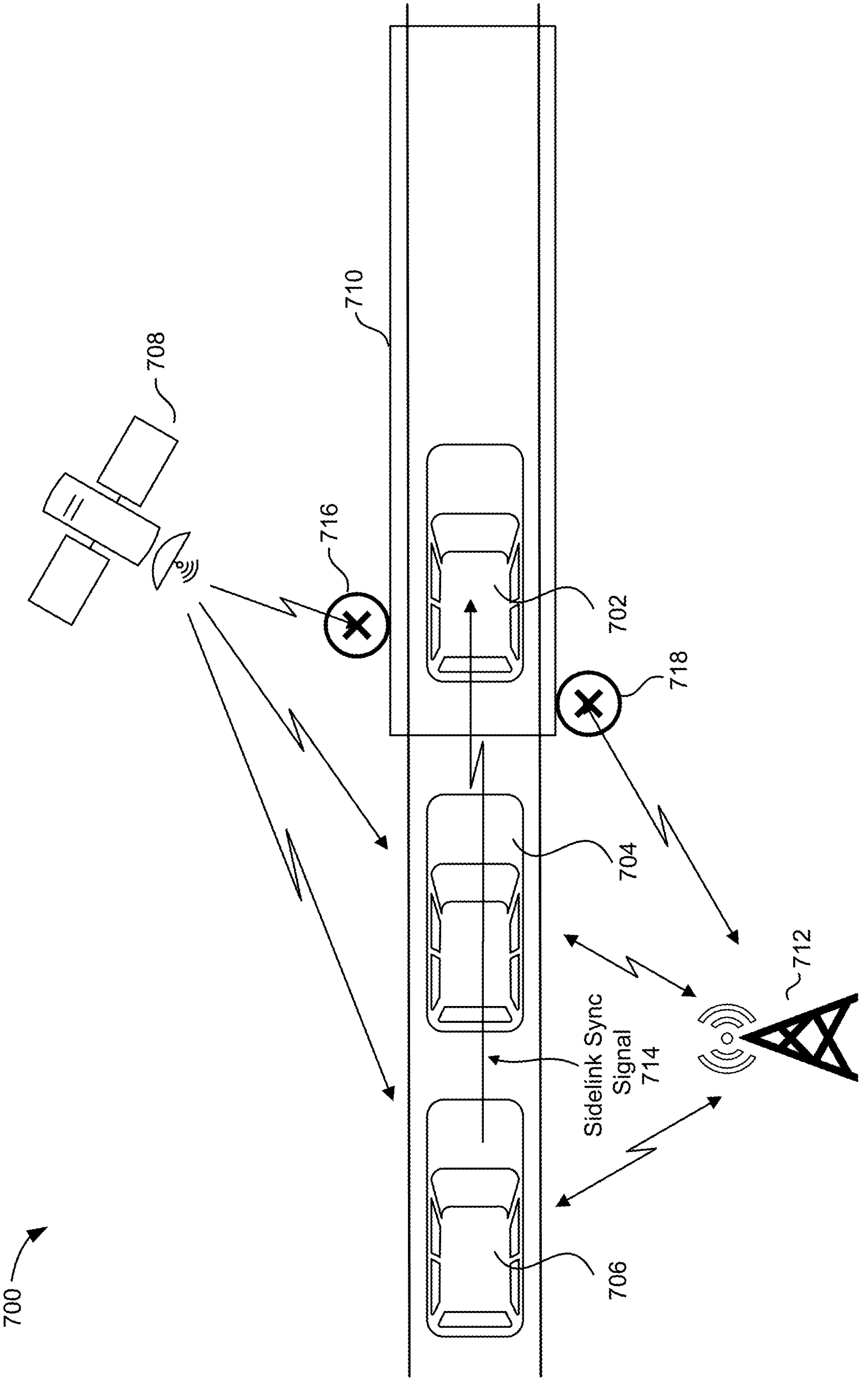

FIG. 7B illustrates a configuration of system 700 that can follow the configuration illustrated in FIG. 7A. In some aspects, UE 702 can be positioned inside of tunnel 710 while UE 704 and UE 706 are positioned outside of tunnel 710. In some examples, UE 704 and UE 706 can receive a GNSS signal from satellite 708. In some cases, UE 704 and UE 706 can be associated with base station 712. In some examples, UE 702 may not be able to receive a GNSS signal (illustrated by 'X' 716) from satellite 708 while inside of tunnel 710. In some cases, UE 702 may not be able to receive a base station signal (illustrated by 'X' 718) from base station 712 while inside of tunnel 710.

In some aspects, UE 706 can be configured as the platoon leader for the UE platoon that includes UE 702, UE 704, and UE 706. In some cases, UE 706 can transmit sidelink synchronization signal (SLSS) 714 that is based on GNSS signal from satellite 708. In some examples, UE 702 can receive SLSS 714 from UE 706 and use SLSS 714 to demodulate sidelink communications from UE 704 and/or UE 706. In some cases, UE 704 can continue to use the GNSS signal from satellite 708 as a SLSS.

As noted previously, systems and techniques are described herein for discontinuous reception (DRX) for Uu-based communications between UEs. In one illustrative example, the systems and techniques can be used for DRX for Uu-based V2X communications between a plurality of UEs, where the plurality of UEs includes one or more connected vehicles (e.g., vehicle UEs, V2X UEs, etc.). In some aspects, one or more destination (e.g., receive) UEs associated with the Uu-based V2X communication may be power-limited or power-sensitive UEs (e.g., such as pedestrian UEs, smartphones, mobile computing devices, etc.). In one illustrative example, the systems and techniques can be used to provide DRX for Uu-based V2X communication, based on V2X traffic characteristics and/or V2X traffic requirements of a source UE, of one or more destination UEs, or both.

In one illustrative example, a network entity can determine a DRX configuration for downlink (DL) receiving of one or more V2X transmissions from a source UE (e.g., a source V2X UE), based on one or more V2X traffic characteristics of the source UE. The source V2X UE can be a particular UE that originates the V2X traffic (e.g., V2X uplink (UL) transmissions) for which the DRX configuration corresponds. For instance, the DRX configuration can be determined by a network entity based on V2X traffic characteristics, service requirements, traffic requirements, etc.

In some aspects, the source V2X UE can provide assistance information to the network used to transmit the Uu-based V2X communication(s) from the source V2X UE to one or more destination UEs. The assistance information can include V2X traffic characteristics corresponding to V2X UL transmissions originated by the source V2X UE and/or service requirements corresponding to the V2X UL transmissions originated by the source V2X UE. In some examples, the source V2X UE can transmit assistance information indicative of one or more preferred DRX configuration parameter values. In some cases, the source V2X UE can transmit assistance information that includes or is indicative of the DRX configuration to be used for DL receiving of some (or all) of the V2X UL transmissions originated by the source V2X UE.

As will be described below, the network can configure DRX for DL receiving of the source V2X UE's uplink V2X transmissions, based on the assistance information received by the network from the source V2X UE. For instance, the network can determine a corresponding DRX configuration for DL receiving of the V2X transmissions originated by the source V2X UE. In one illustrative example, the network can transmit the DRX configuration to one or more V2X-capable UEs. In some aspects, a network entity can transmit the DRX configuration to the one or more V2X-capable UEs using a multicast-broadcast services (MBS) DRX configuration mechanism. For instance, a network entity can transmit the DRX configuration to the one or more V2X-capable UEs using a multicast control channel (MCCH).

In another illustrative example, the network entity can transmit the DRX configuration to the one or more V2X-enabled UEs using a dedicated configuration mechanism for V2X. For instance, the network entity can transmit a system information block (SIB) indicative of the DRX configuration, a dedicated radio resource control (RRC) message indicative of the DRX configuration, etc.

Based on receiving a DRX configuration from the network (e.g., from an associated or corresponding network entity), each V2X-enabled UE of one or more V2X-enabled UEs associated with the source V2X UE can receive V2X transmissions (e.g., originated from the source V2X UE) in DL using the DRX configuration. For instance, each V2X-enabled UE can receive the V2X transmissions in DL during a DRX on-duration indicated by the DRX configuration. In one illustrative example, the network entity determines the DRX configuration to align a periodicity of the DR on-duration with a periodicity of the V2X UL transmissions originated from the source V2X UE.

In some aspects, a source UE can transmit assistance information to a network entity. As used herein, the "source UE" can refer to a connected vehicle (e.g., V2X UE) that originates one or more V2X UL transmissions. In Uu-based V2X, the V2X UL transmissions are forwarded to one or more destination UEs over a mobile network, such as a 5G network, rather than being transmitted directly between UEs as in sidelink-based V2X. The "destination UE" can refer to a V2X-enabled or V2X-capable UE that is associated with the source UE. For instance, a destination UE may be subscribed to the source UE to receive (e.g., from the network), one or more of the V2X UL messages originated by the source UE. In some examples, a destination UE may transmit a request to the network indicative of a request to subscribe to some (or all) of the V2X UL messages originated by the source UE. In other examples, the network may identify one or more destination UEs for receiving a V2X UL message originated by the source UE. In some examples, the source UE may provide the network with information indicative of one or more destination UEs for receiving in DL a V2X UL message originated by the source UE.

Figure 8:
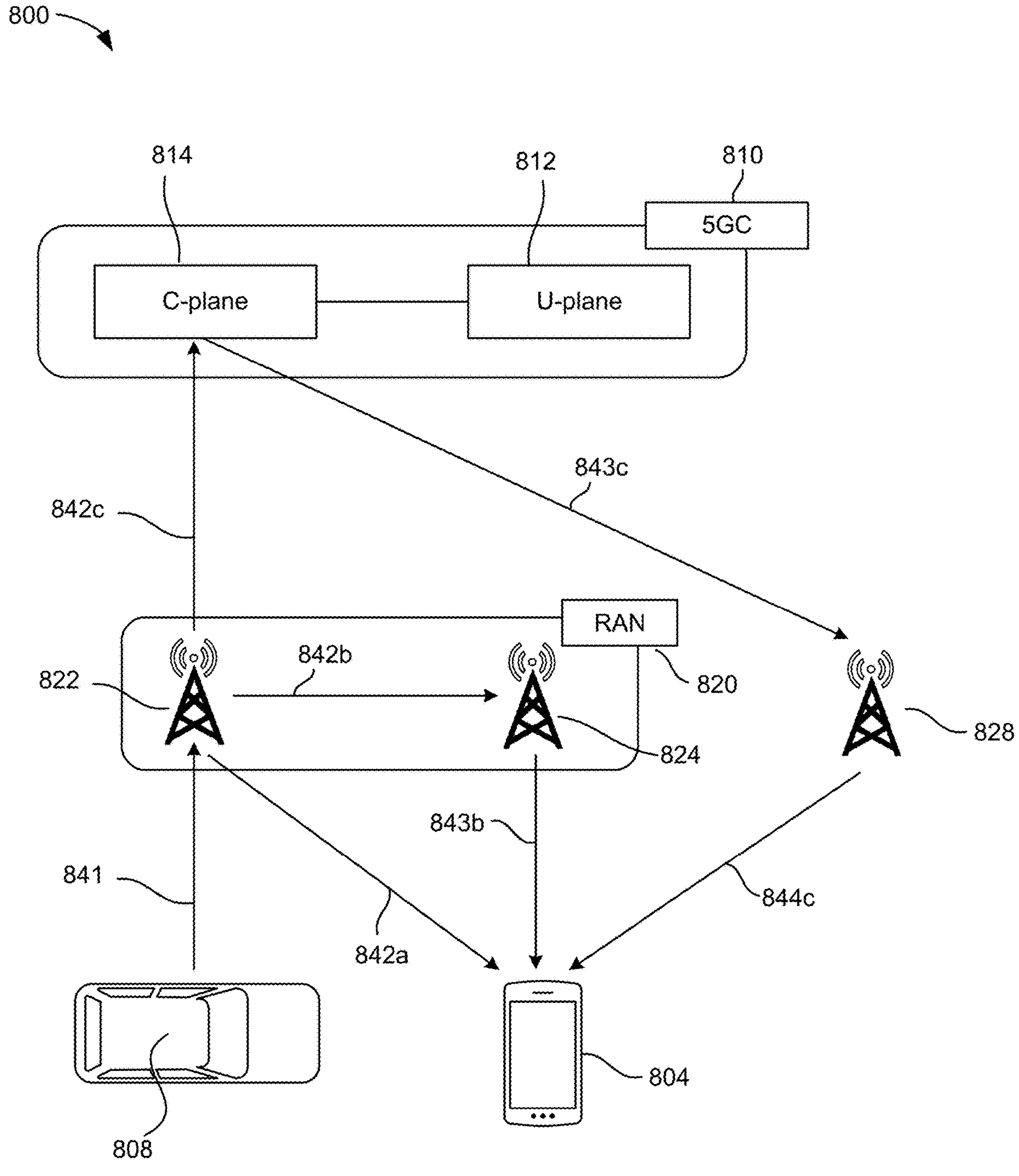
FIG. 8 is a diagram illustrating an example network configuration associated with assistance information transmitted by a source UE to a control plane network entity, in accordance with some examples.

In some aspects, the source UE can transmit assistance information to one or more control plane network entities (e.g., such as a base station, gNB, attached NG RAN node, etc., associated with the source UE; an application management function (AMF) associated with the source UE; etc.). Examples of control plane signaling of DRX configuration assistance information associated with a source UE are depicted in FIG. 8.

Figure 9A:
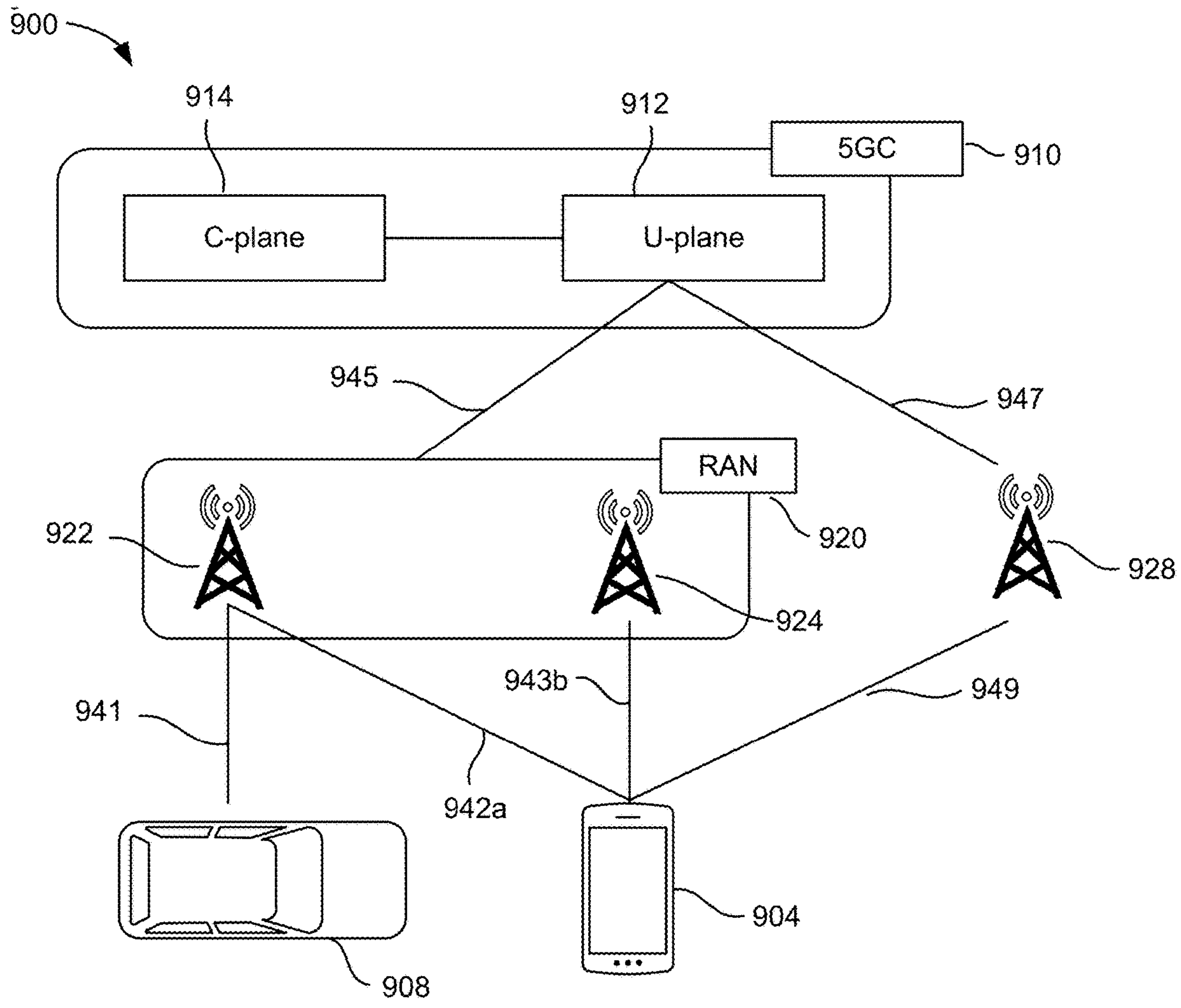
FIG. 9A is a diagram illustrating an example network configuration associated with assistance information transmitted by a source UE to a user plane network entity, in accordance with some examples.
Figure 9B:
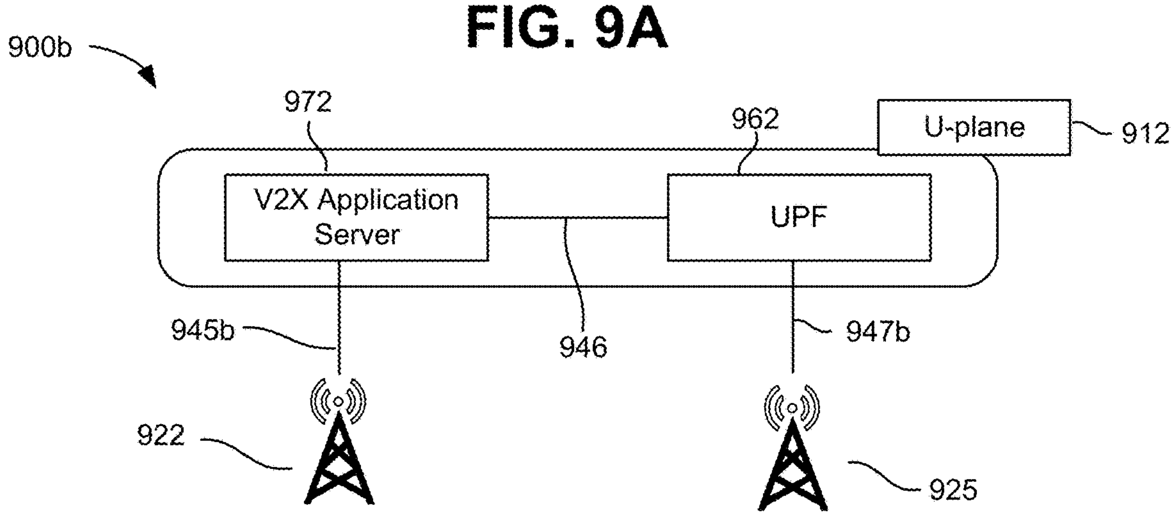
FIG. 9B is a diagram illustrating an example network configuration of a user plane including a vehicle-to-everything (V2X) application server and a User Plane Function (UPF), in accordance with some examples.

In some examples, the source UE can transmit assistance information to one or more user plane network entities (e.g., such as a V2X application server, a User Plane Function (UPF), etc.). Examples of user plane signaling of DRX configuration assistance information associated with a source UE are depicted in FIGS. 9A and 9B.

As noted previously, FIG. 8 is a diagram illustrating an example network configuration 800 associated with assistance information transmitted by a source UE to a control plane network entity, in accordance with some examples. In some aspects, a first UE 808 can be a connected vehicle (e.g., vehicle UE, V2X UE, etc.) and may be the same as or similar to the various UEs described herein and depicted in FIGS. 1-9. The V2X UE 808 can also be referred to herein as "a source UE" (e.g., a source or originator of one or more V2X UL transmissions). A second UE 804 can be a V2X-enabled or V2X-capable, and may be the same as or similar to one or more of the various UEs describe herein and depicted in FIGS. 1-9. The V2X-capable UE 804 can also be referred to herein as a "destination UE" (e.g., a destination or recipient in DL of the one or more V2X UL transmissions originated by the source UE 808).

The source UE 808 and destination UE 804 may each be associated with one or more RANs, such as the RAN 820. Each RAN can include one or more base stations 822 (e.g., gNB, etc.). For instance, RAN 820 can include base station 822 and base station 824. A third base station 828 can be included in a different RAN (e.g., a RAN other than RAN 820). Each of the RANs and each of the base stations 822, 824, 828 can be associated with a network core, such as the 5G core (5GC) 810. In one illustrative example, the RAN 820 can be the same as or similar to the RAN 220 of FIGS. 2A and 2B; one or more of the base stations 822, 824, 828 can be the same as or similar to the gNB 222 and/or ng-eNB 224 of FIGS. 2A and 2B; the 5GC 810 can be the same as or similar to the 5GC 210 of FIG. 2A and/or the 5GC 260 of FIG. 2B; 2B; the control plane (C-plane) 814 of FIG. 8 can be the same as or similar to the C-plane 214 of FIG. 2A; and/or the user plane (U-plane) 812 of FIG. 8 can be the same as or similar to the U-plane 212 of FIG. 2A.

In one illustrative example, the source UE 808 can transmit assistance information using one or more access stratum (AS) layer messages. For instance, the one or more AS layer messages can include or be indicative of explicit control information for assisting a network entity of network configuration 800 in determining a DRX configuration for V2X UL messages originated by the source UE 808.

In some aspects, the one or more AS layer messages can be radio resource control (RRC) messages transmitted from source UE 808 to its attached (e.g., corresponding or associated) base station 822. For instance, source UE 808 can use link 841 to transmit one or more RRC messages indicative of assistance information to its attached NG-RAN node 822 (e.g., a gNB). The attached NG-RAN node 822 corresponding to source UE 808 can determine a corresponding attached NG-RAN node of each destination UE of one or more destination UEs that will receive in DL the V2X UL transmissions originated from source UE 808.

In some examples, source UE 808 and destination UE 804 may be associated with (e.g., attached to) the same base station (e.g., NG-RAN node, gNB, etc.). For instance, source UE 808 and destination UE 804 may both be associated with the base station 822 included in RAN 820. In these examples, source UE 808 can transmit assistance information to base station 822 (e.g., as one or more RRC messages). Base station 822 can determine corresponding DRX configuration information for destination UE 804, based on the V2X traffic characteristics and/or other information determined from the assistance information provided by source UE 808. Base station 822 can then transmit, signal, or otherwise indicate the determined DRX configuration to destination UE 804, using the link **842*a* (e.g., a communication path of source UE 808-[link 841]-base station 822-[link 842*a*]-destination UE 804**).

In another example, source UE 808 may transmit assistance information to its attached NG-RAN node (e.g., base station 822), where destination UE 804 and source UE 808 are associated with different NG-RAN nodes. For instance, destination UE 804 can be associated with a different NG-RAN node that is included in the same RAN as the attached NG-RAN node 822 of the source UE 808. In one illustrative example, destination UE 804 can be associated with the additional NG-RAN node 824 included in RAN 820. In some aspects, the attached NG-RAN node 822 of source UE 808 can receive assistance information using one or more AS layer messages (e.g., such as RRC messages) received over link 841, and can transmit or forward the assistance information to the NG-RAN node 824 that is associated with destination UE 804. For instance, source NG-RAN node 822 can transmit the assistance information to the destination NG-RAN node 824 using an Xn interface link **842*b*. The destination NG-RAN node 824 can then use the assistance information to determine the corresponding DRX configuration for destination UE 804 (e.g., based on the V2X traffic characteristics and/or other information determined from the assistance information provided by source UE 808). Destination NG-RAN node 824 can then transmit, signal, or otherwise indicate the determined DRX configuration to destination UE 804, using the link 843*b* (e.g., a communication path of source UE 808-[link 841]-source NG-RAN node 822-[link 842*b*]-destination NG-RAN node 824-[link 843*b*]-destination UE 804**).

In another example, the destination UE 804 can be associated with an NG-RAN node that is included in a different RAN than the source NG-RAN node 822. For instance, destination UE 804 can be associated with a destination NG-RAN node 828 that is not included in RAN 820. In some aspects, the source NG-RAN node 822 can transmit or forward the assistance information received from source UE 808 to the destination NG-RAN node 828 via one or more network entities included in 5GC 810. For instance, when the assistance information is signaled on the control plane (e.g., as an AS layer message, such as an RRC message), the destination NG-RAN node 828 can receive the assistance information using a communication path of source UE 808-[link 841]-source NG-RAN node 822-[link **842*c*]-C-plane 814-[link 843*c*]-destination NG-RAN node 828-[link 844*c*]-destination UE 804. In some examples, the corresponding DRX configuration for destination UE 804 can be determined by destination NG-RAN node 828. In some aspects, the DRX configuration can be determined by one or more network entities within 5GC 810** (e.g., one or more 5GC control plane network entities, such as an AMF, etc.).

In another illustrative example, source UE 808 can transmit assistance information to a control plane network entity using a non-access stratum (NAS) layer message indicative of explicit control information for assisting the network in determining the corresponding DRX configuration for DL receiving (e.g., by destination UE 804) of V2X UL transmissions originated by source UE 808. For instance, source UE 808 can transmit one or more NAS messages to an AMF included in C-plane 814 of 5GC 810. The AMF can be an AMF corresponding to or otherwise associated with source UE 808, and may be the same as or different from an AMF corresponding to or otherwise associated with destination UE 804.

For instance, where source UE 808 and destination UE 804 are associated with the same AMF of C-plane 814 (e.g., such as the AMF 264 of 5GC 260 of FIG. 2B), an assistance information communication path can be implemented as source UE 808-[link 841]-source NG-RAN node 822-[link **842*c*]-AMF within C-plane 814-[link 843*c*]-destination NG-RAN node 828-[link 844*c*] destination UE 804**.

In examples where source UE 808 and destination UE 804 are associated with different AMFs, the source AMF (e.g., AMF associated with source UE 808) can transmit or forward the one or more NAS messages indicative of the assistance information to the destination AMF (e.g., AMF associated with destination UE 804), and the destination AMF can transmit the assistance information to the destination NG-RAN node 828.

In another illustrative example, source UE 808 can transmit assistance information in user data (e.g., user plane signaling). For instance, FIG. 9A is a diagram illustrating an example network configuration 900 associated with assistance information transmitted by a source UE to a user plane network entity, and FIG. 9B is a diagram illustrating an example network configuration **900*b*** of a user plane including a vehicle-to-everything (V2X) application server and a User Plane Function (UPF), in accordance with some examples.

In some cases, a source UE 908 can be the same as or similar to the source UE 808 of FIG. 8 and a destination UE 904 can be the same as or similar to the destination UE 804 of FIG. 8. The links 941, **942*a*, 943*b* may be the same as or similar to the links 841, 842*a*, 843*b* (respectively) of FIG. 8. The RAN 920, first base station (e.g., first NG-RAN node) 922, and second base station (e.g., second NG-RAN node) 924 may be the same as or similar to the RAN 820, NG-RAN node 822, and NG-RAN node 824 (respectively) of FIG. 8. The third base station (e.g., third NG-RAN node) 928 may be the same as or similar to the NG-RAN node 828 of FIG. 8. The 5GC 910, C-plane 914, and U-plane 912 may be the same as or similar to the 5GC 810, C-plane 814, and U-plane 812 (respectively) of FIG. 8**.

In some aspects, the source UE 908 can transmit assistance information in user data provided to U-plane 912 of 5GC 910 (e.g., using the communication path source UE 908-[link 941]-source NG-RAN node 922-[link 945]-U-plane 912). In some examples, the source UE 908 can transmit user plane information that includes and/or is indicative of a V2X transmit (Tx) profile of source UE 908 and/or V2X UL transmissions originated by source UE 908. In some aspects, the user plane information can further include or indicate a quality-of-service (QOS) profile associated with source UE 908 and/or the V2X UL transmissions originated by source UE 908. U-plane 912 (or a network entity thereof) can transmit the assistance information corresponding to source UE 908 V2X UL transmissions to the destination NG-RAN node 928 using the link 947. Destination NG-RAN node 928 can determine the corresponding DRX configuration for destination UE 904 to receive in DL one or more V2X UL transmissions originated by source UE 908, and can transmit the corresponding DRX configuration to destination UE 904 using link 949.

In another example, the destination NG-RAN node associated with destination UE 904 can be included in the same RAN 920 as the source NG-RAN node 922. For instance, U-plane 912 (or a network entity thereof) can receive user plane information indicative of the assistance information from source NG-RAN node 922 using link 945, and can provide the user plane information to a destination NG-RAN node 924 using the link 945. Destination NG-RAN node 924 can determine the corresponding DRX configuration for destination UE 904 and can transmit the corresponding DRX configuration to destination UE 904 using link 943*b*.

In some examples, the user data indicative of the assistance information for V2X UL transmissions originated by source UE 908 can be provided to a V2X application server within U-plane 912. For instance, FIG. 9B depicts an example configuration 900*b* where U-plane 912 includes a V2X application server 972 and a UPF 962. In some cases, UPF 962 can be the same as or similar to UPF 262 of FIG. 2B.

V2X application server 972 can receive the user plane assistance information from source NG-RAN node 922 using link 945*b* (e.g., which may be the same as link 945 of FIG. 9A). In some aspects, V2X application server 972 can extract QoS profile information, V2X Tx profile information, or other information for determining the DRX configuration from the assistance information of source UE 908. V2X application server 972 can use link 946 within U-plane 912 to transmit the extracted assistance information to UPF 962, which provides the assistance information to the destination NG-RAN node 925 using link 947*b* (e.g., which may be the same as link 947 of FIG. 9A).

In another example, V2X application server 972 can receive the user plane assistance information from source NG-RAN node 922 using link 945*b*, and can forward the received assistance information to UPF 962 using link 946 within U-plane 912. The UPF 962 can extract QoS profile information, V2X Tx profile information, or other information for determining the DRX configuration from the assistance information of source UE 908. UPF 912 can transmit the extracted assistance information to destination NG-RAN node 925 using link 947*b*. In some cases, destination NG-RAN node 925 of FIG. 9B can be the same as or similar to one or more of the NG-RAN nodes 924 and/or 928 of FIG. 9A.

In some examples, the assistance information corresponding to a source UE can include information that may be used by a network entity (e.g., destination base station, NG-RAN node, gNB, etc.) to determine a corresponding DRX configuration for a destination UE of V2X UL transmissions originated by the source UE. In one illustrative example, the assistance information may be indicative of one or more of a cast type of the V2X UL messages from the source UE (e.g., unicast, broadcast, etc.), whether the V2X UL messages from the source UE are periodical or burst traffic, a periodicity for traffic generation (e.g., where the V2X UL messages from the source UE are periodical), etc.

In some cases, the assistance information can include or indicate one or more QoS parameters and/or characteristics of the V2X UL messages from the source UE. For instance, the assistance information can include 5G QOS Identifier (5QI) information, PC5 5QI (PQI) information, priority information, bit rate information, packet delay budget information, etc.

In some aspects, the assistance information can include or be indicative of one or more of a V2X application ID, a service type ID, a group ID, a source ID, and/or a destination ID associated with the V2X UL messages from the source UE.

In some examples, the assistance information can include or be indicative of one or more of a required or minimum communication range associated with the V2X UL messages from the source UE, the source UE, and/or the destination UE.

In some examples, the assistance information can include or be indicative of location information corresponding to the source V2X UE (e.g., geolocation information, geocoordinate information, etc.).

In another illustrative example, the assistance information can include or be indicative of a preferred DRX configuration for one or more destination UEs, where the preferred DRX configuration is determined by the source UE that originated the V2X UL transmissions provided to the one or more destination UEs. For instance, the source UE can determine a DRX configuration based on its own V2X traffic characteristics. In some aspects, the source UE can determine one or more DRX configuration parameter values, which may include some (or all) of a DRX periodicity value, a DRX offset value, a DRX on-duration timer value, a DRX inactivity timer value, etc.

In some cases, the source UE can transmit assistance information indicative of a portion of the DRX configuration. For instance, the source UE cant transmit assistance information indicative of the DRX periodicity value and the DRX offset value. Remaining parameters of the DRX configuration can be determined by the destination NG-RAN node.

In some aspects, one or more (or all) of the assistance information and/or assistance information parameters described above can be indicated or signaled (e.g., by the source UE) using one or more of a V2X Tx profile of the source UE, a QoS profile of the source UE, and/or UE Assistance Information from the source UE to the network.

In some examples, a network entity receiving assistance information from the source UE can determine one or more destination NG-RAN nodes corresponding to or associated with destination UEs for receiving in DL the V2X UL transmissions originated by the source UE. For instance, destination NG-RAN nodes can be determined as the NG-RAN nodes (e.g., of a plurality of NG-RAN nodes of the network) that will be transmitting the source V2X UE's traffic in downlink. In one illustrative example, a network entity included in the 5GC 810 of FIG. 8 or 5GC 910 of FIG. 9A (e.g., V2X application server 972 of FIG. 9B, an AMF included in C-plane 814 of FIG. 8 or C-plane 914 of FIG. 9A, etc.) can determine the one or more NG-RAN nodes that will be used as destination NG-RAN nodes.

For instance, a network entity (e.g., 5GC network entity) can determine the one or more destination NG-RAN nodes based on a desired or minimum communication range, a source UE location, cell size information, location information of the destination NG-RAN nodes (and/or location information of candidate NG-RAN nodes), etc.

In some examples, the one or more destination NG-RAN nodes can receive the assistance information transmitted from the source UE to the source NG-RAN node (e.g., as described above with respect to FIGS. 8-9B). As noted previously, the assistance information may include one or more of a V2X application ID, a service type ID, a group ID, etc. In some cases, the assistance information is associated with the application layer or service layer of the network, and may be unknown to the access stratum (AS) layer. In some aspects, where assistance information is transmitted to a V2X application server (e.g., such as V2X application server 972 of FIG. 9B) or to a UPF (e.g., such as UPF 962 of FIG. 9B), the V2X application server or UPF can map the identifiers included in the assistance information (e.g., V2X application ID, service type ID, group ID, etc.) to a layer 2 (L2) source and/or to a destination ID. In some cases, the V2X application server or UPF can transmit the mapped L2 source and/or destination ID to the identified destination NG-RAN node(s).

In some examples, assistance information may be routed at the RAN (e.g., RAN 820 of FIG. 8, RAN 920 of FIG. 9A, etc.). For instance, assistance information can be routed from one NG-RAN node to another NG-RAN node via an Xn link (e.g., such as the Xn link 842*b* of FIG. 8). In some aspects, ID mapping (e.g., as described above) may be performed by the source UE that originates the V2X UL transmissions and that generates the assistance information. For instance, the source UE can determine a mapped L2 source and/or destination ID, and may include the mapped L2 source and/or destination ID in the assistance information transmitted to the source NG-RAN node. The source NG-RAN node can route (e.g., forward, transmit, etc.) the assistance information with the mapped L2 source and/or destination ID to the destination NG-RAN node via an Xn link, such as the Xn link 842*b* of FIG. 8.

In one illustrative example, a destination NG-RAN node can determine and/or generate the corresponding DRX configuration for a destination UE to receive in DL the V2X UL transmissions originated by the source UE. In some cases, the DRX configuration can be determined based at least in part on the assistance information received by the destination NG-RAN node. In some aspects, a destination UE may receive V2X traffic in DL originated from multiple source UEs. In one illustrative example, the destination NG-RAN node (E.g., associated with the destination UE) can determine a DRX configuration for the destination UE that aligns the DRX configuration across the V2X DL traffic originated from multiple source UEs to maximize a power saving gain at the destination UE. For instance, the destination NG-RAN node can determine a DRX configuration that aligns the DRX on-duration corresponding to receiving the V2X DL traffic originated from each source UYE of the multiple source UEs.

In some aspects, the destination NG-RAN node can transmit the DRX configuration using a multicast and broadcast services (MBS) DRX configuration mechanism. For instance, a network entity can transmit the DRX configuration to the one or more V2X-capable UEs using a multicast control channel (MCCH). In some cases, the destination NG-RAN node can transmit the DRX configuration in MCCH when 5G MBS is used to deliver V2X traffic in downlink.

In another example, the destination NG-RAN node can transmit the DRX configuration to destination UEs (e.g., one or more V2X-capable UEs requesting or otherwise associated with the V2X UL traffic originated by the source UE) using a dedicated configuration mechanism for V2X. The dedicated configuration mechanism for V2X can be different from the MBS DRX configuration mechanism. For instance, the destination NG-RAN node can transmit DRX configuration information to destination UEs on a per-V2X application level, a per-V2X service level, a per-destination level, a per-group level, etc. In some cases, destination UEs running the same V2X application and/or V2X service, having the same destination ID, belonging to the same group, etc., can receive the same DRX configuration from the destination NG-RAN node.

In some aspects, the destination NG-RAN node can provide one or more destination UEs with the DRX configuration using a broadcast message in downlink. For instance, the destination NG-RNA node can provide the one or more destination UEs with the DRXC configuration using a system information block (SIB) broadcast in DL.

In another illustrative example, the destination NG-RAN node can transmit the DRX configuration in a broadcast message or in a dedicated message, based on cast type. For example, for unicast or connected groupcast, the destination NG-RAN node can transmit the DRX configuration in a UE-specific RRC message. For broadcast or connectionless groupcast, the destination NG-RAN node can transmit the DRX configuration in SIB.

Based on receiving or obtaining in DL the corresponding DRX configuration for V2X UL transmissions originated by a particular source UE, the one or more destination UEs associated with the particular source UE can configure DRX based on the corresponding DRX configuration. In some aspects, each destination UE can receive the DRX configuration from a destination NG-RAN node associated with the destination UE. The one or more destination UEs for V2X UL transmissions of the particular source UE can be associated with the same destination NG-RAN node and/or can be associated with multiple, different NG-RAN nodes. In some aspects, the one or more destination UEs for V2X UL transmissions of the particular source UE can be configured with the same DRX configuration and/or can be configured using multiple, different DRX configurations, one or more of which can be a UE-specific DRX configuration corresponding to a particular one of the destination UEs. As noted previously, the destination UEs can receive corresponding DRX configuration information in SIB, UE-specific RRC messages, etc.

A destination UE can receive in DL one or more V2X UL messages originated by the particular source UE, based on the corresponding DRX configuration provided to the destination UE by its associated destination NG-RAN node. In some aspects, all V2X UEs may follow the DRX configuration for V2X receiving in downlink. In some examples, DRX configuration can be based on capability and/or category information of V2X UEs. For instance, power-limited or power-aware V2X destination UEs (e.g., such as pedestrian UEs, smartphones, mobile computing devices, etc.) can receive V2X traffic in downlink following a DRX configuration and non-power-limited V2X destination UEs (e.g., such as connected vehicles or vehicle UEs, etc.) can receive V2X traffic in downlink without using DRX and without following a DRX configuration.

Figure 10:
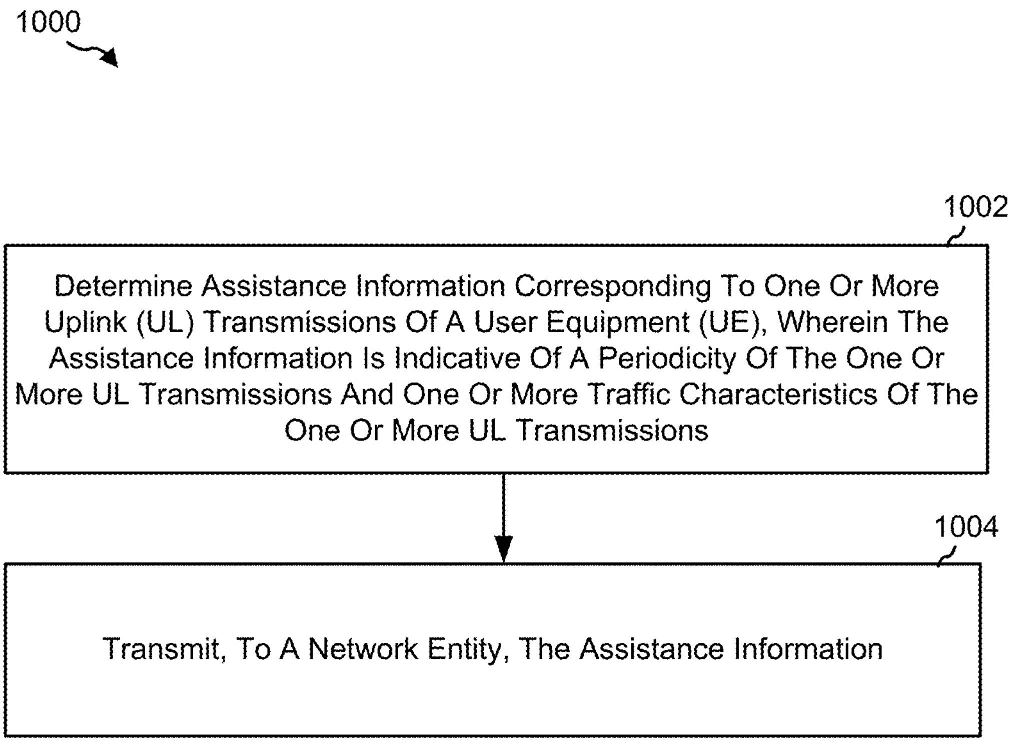
FIG. 10 is a flow chart illustrating an example of a process for wireless communications performed at a User Equipment (UE), in accordance with some examples.

FIG. 10 is a flow chart illustrating an example of a process 1000 for wireless communications. The process 1000 can be performed by a User Equipment (UE) or by a component, system, or apparatus of the UE (e.g., a chipset of the UE, or other component or system of the UE). For example, the UE can include one or more of the UEs illustrated in FIG. 1 (e.g., including UE 104, UE 152, UE 164, UE 182, UE 190, etc.); the UE 204 of FIG. 2A or FIG. 2B; the UE 221*c* of FIG. 2C; the UEs 304, 305, 307 of FIG. 3; the UE 404 of FIG. 4; the UE 507 of FIG. 5; the UEs 602, 604 of FIG. 6; the UEs 702, 704, 706 of FIG. 7A or FIG. 7B; the UEs 804, 808 of FIG. 8; the UEs 904, 908 of FIG. 9A; etc.

In one illustrative example, the process 1000 can be performed by a source UE, such as a source V2X UE configured to transmit one or more V2X UL transmissions. For instance, the process 1000 can be performed by a UE that is the same as or similar to the first UE 808 of FIG. 8, which can be a connected vehicle (e.g., vehicle UE, V2X UE, etc.) and/or can be referred to herein as "a source UE" (e.g., a source or originator of one or more V2X UL transmissions). In another illustrative example, the process 1000 can be performed by the V2X source UE 908 of FIG. 9A, which can be a connected vehicle (e.g., vehicle UE, V2X UE, etc.).

At block 1002, the process 1000 includes determining assistance information corresponding to one or more uplink (UL) transmissions of the UE, wherein the assistance information is indicative of a periodicity of the one or more UL transmissions and one or more traffic characteristics of the one or more UL transmissions. In some examples, the one or more UL transmissions are vehicle-to-everything (V2X) UL transmissions of the UE, and the assistance information can be indicative of a periodicity of the one or more V2X UL transmissions. In some examples, the assistance information is further indicative of one or more V2X traffic characteristics of the one or more V2X UL transmissions of the UE. For instance, the assistance information can correspond to one or more V2X UL transmissions of the vehicle UE 808 of FIG. 8 and/or the vehicle UE 908 of FIG. 9A. In some cases, the one or more V2X traffic characteristics include at least one of a cast type or a periodicity of the one or more V2X UL transmissions of the UE. The one or more V2X traffic characteristics can include at least one of a V2X application identifier, a V2X service type identifier, a group identifier, a source identifier, or a destination identifier associated with the one or more V2X UL transmissions of the UE. In some examples, the assistance information is indicative of one or more quality-of-service (QOS) parameter values associated with the one or more V2X UL transmissions of the UE.

In some cases, the assistance information is indicative of at least a portion of a discontinuous reception (DRX) configuration information associated with the one or more V2X UL transmissions of the UE. In some examples, the DRX configuration information can be determined at least in part by one or more network entities associated with RAN 820 of FIG. 8 and/or RAN 920 of FIG. 9A. In some cases, the DRX configuration information can be forwarded to a second UE (e.g., such as V2X-capable UE 804 of FIG. 8 and/or V2X-capable UE 904 of FIG. 9A) and can be used to receive a V2X UL transmission from the first UE. For instance, a DRX on-duration associated with the DRX configuration information can be aligned with the periodicity of the one or more V2X UL transmissions of the UE.

In some examples, the assistance information can be included in one or more of a V2X transmit (Tx) profile of the UE or a quality-of-service (QOS) profile of the UE.

At block 1004, the process 1000 includes transmitting, to a network entity, the assistance information. For example, the network entity can include (or can be a component of) a server (e.g., a cloud-based server), a road side unit (RSU), a vehicle, a base station (e.g., the base station 102 of FIG. 1), a portion of a base station having a disaggregated architecture (e.g., one or more of the CU 211*c*, the DU 231*c*, the RU 241*c*, the Near-RT RIC 227*c*, or the Non-RT RIC 217*c* of the disaggregated base station 200*c* of FIG. 2C), or other network entity and/or network device.

In some cases, the network entity can be a base station, such as one or more of the base stations 822, 824, and 828 of FIG. 8 and/or the base stations 922, 924, 928 of FIG. 9A. In some examples, the network entity can be included in a RAN, such as the RAN 820 of FIG. 8 and/or the RAN 920 of FIG. 9A. In some examples, the network entity can be a 5G core network entity or component thereof, and for instance may be included in the 5GC 810 of FIG. 8 and/or the 5GC 910 of FIG. 9A. In some examples, the network entity can be included in or associated with a control plane, such as the control plane 814 of FIG. 8 and/or the control plane 914 of FIG. 9A. In some cases, the network entity can be included in or associated with a user plane, such as the user plane 812 of FIG. 8 and/or the user plane 912 of FIG. 9A.

In some cases, the network entity is a Radio Access Network (RAN) node associated with the UE and the assistance information is based on a Radio Resource Control (RRC) message from the UE to the RAN node. For instance, the assistance information can be based on an RRC message from V2X UE 808 of FIG. 8 to the RAN node 820 of FIG. 8 (e.g., base station 822, base station 824, etc.). In another example, the assistance information can be based on an RRC message from V2X UE 908 of FIG. 9A to the RAN node 920 of FIG. 9A (e.g., base station 922, base station 924, etc.).

In some examples, the network entity is an Access and Mobility Management Function (AMF) associated with the UE and the assistance information is based on a Non-Access Stratum (NAS) message from the UE to the AMF. For instance, the network entity can be the same as or similar to the AMF 264 of FIG. 2B and/or can be an AMF included in 5GC 810 of FIG. 8 or 5GC 910 of FIG. 9A.

In another example, the network entity is a V2X application server associated with the UE and the assistance information is based on a user plane message from the UE to the V2X application server. For instance, the V2X application server can be the same as or similar to the V2X application server 972 of FIG. 9B. In some cases, the V2X application server can be included in the user plane 912 of 5GC 910 of FIG. 9A and/or can be included in the user plane 812 of 5GC 810 of FIG. 8.

Figure 11:
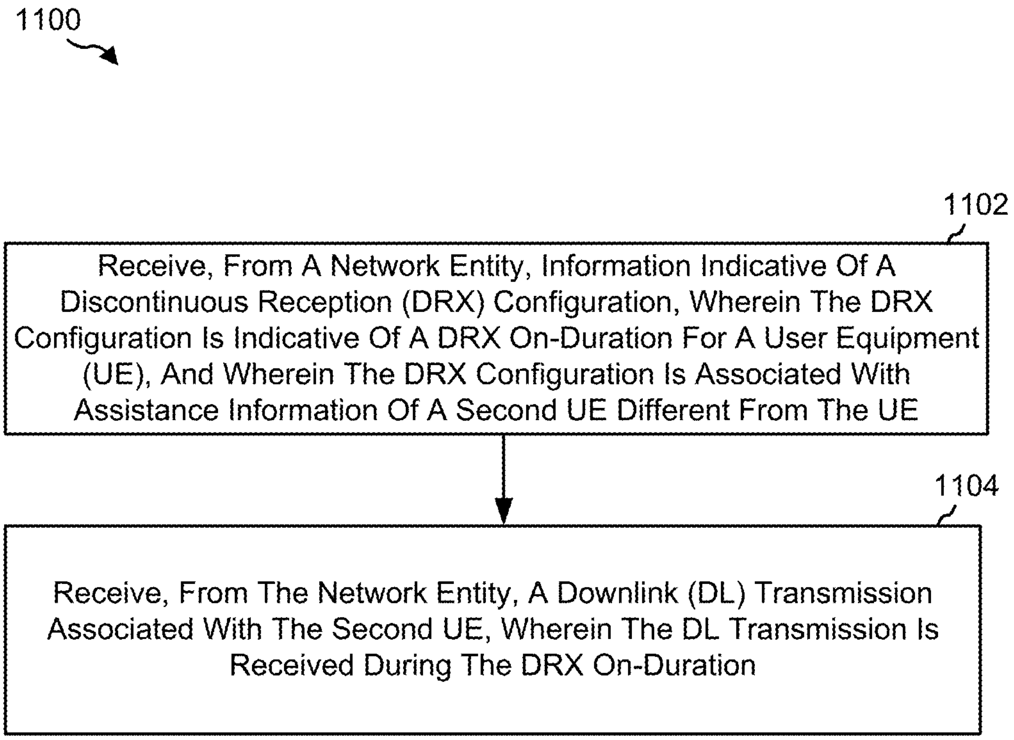
FIG. 11 is a flow chart illustrating another example of a process for wireless communications performed at a UE, in accordance with some examples.

FIG. 11 is a flow chart illustrating another example of a process 1100 for wireless communications. The process 1100 can be performed by a User Equipment (UE) or by a component, system, or apparatus of the UE (e.g., a chipset of the UE, or other component or system of the UE). For example, the UE can include one or more of the UEs illustrated in FIG. 1 (e.g., including UE 104, UE 152, UE 164, UE 182, UE 190, etc.); the UE 204 of FIG. 2A or FIG. 2B; the UE 221*c* of FIG. 2C; the UEs 304, 305, 307 of FIG. 3; the UE 404 of FIG. 4; the UE 507 of FIG. 5; the UEs 602, 604 of FIG. 6; the UEs 702, 704, 706 of FIG. 7A or FIG. 7B; the UEs 804, 808 of FIG. 8; the UEs 904, 908 of FIG. 9A; etc.

In some cases, the process 1100 can be performed by a UE that is different than a UE used to perform process 1000. For instance, the process 1100 can be performed by a V2X destination UE (e.g., a V2X-capable UE) associated with a V2X source UE that performs process 1000. The "destination UE" can refer to a V2X-enabled or V2X-capable UE that is associated with the source UE. For instance, a destination UE may be subscribed to the source UE to receive (e.g., from the network), one or more of the V2X UL messages originated by the source UE. In some examples, a destination UE may transmit a request to the network indicative of a request to subscribe to some (or all) of the V2X UL messages originated by the source UE. In other examples, the network may identify one or more destination UEs for receiving a V2X UL message originated by the source UE. In some examples, the source UE may provide the network with information indicative of one or more destination UEs for receiving in DL a V2X UL message originated by the source UE.

In some cases, the process 1100 can be performed by a destination UE that is the same as or similar to the V2X-capable UE 804 of FIG. 8 and/or the V2X-capable UE 904 of FIG. 9A. The process 1000 can be performed by a source UE that is the same as or similar to the vehicle UE (e.g., V2X UE) 808 of FIGS. 8 and/or 908 of FIG. 9A. In one illustrative example, the process 1100 can be performed by a destination UE, such as a destination V2X-capable UE configured to receive, in DL, one or more V2X UL transmissions of a V2X source UE. For instance, the process 1100 can be performed by a UE that is the same as or similar to the UE 804 of FIG. 8. In another illustrative example, the process 1100 can be performed by the UE 904 of FIG. 9A.

At block 1102, the process 1100 includes receiving, from a network entity, information indicative of a discontinuous reception (DRX) configuration, wherein the DRX configuration is indicative of a DRX on-duration for the UE, and wherein the DRX configuration is associated with assistance information of a second UE different from the UE.

In some cases, the DRX configuration is based on a periodicity of one or more vehicle-to-everything (V2X) uplink (UL) transmissions of the second UE, and wherein the DRX on-duration is aligned with the periodicity of the one or more V2X UL transmissions. For example, the UE can be the V2X-capable UE 804 of FIG. 8 or 904 of FIG. 9A, and the second UE can be the V2X UE 808 of FIG. 8 or 908 of FIG. 9A.

In some examples, the network entity can be a base station, such as one or more of the base stations 822, 824, and 828 of FIG. 8 and/or the base stations 922, 924, 928 of FIG. 9A. In some examples, the network entity can be included in a RAN, such as the RAN 820 of FIG. 8 and/or the RAN 920 of FIG. 9A. In some examples, the network entity can be a 5G core network entity or component thereof, and for instance may be included in the 5GC 810 of FIG. 8 and/or the 5GC 910 of FIG. 9A. In some examples, the network entity can be included in or associated with a control plane, such as the control plane 814 of FIG. 8 and/or the control plane 914 of FIG. 9A. In some cases, the network entity can be included in or associated with a user plane, such as the user plane 812 of FIG. 8 and/or the user plane 912 of FIG. 9A.

In some examples, the assistance information is indicative of one or more vehicle-to-everything (V2X) traffic characteristics of one or more V2X uplink (UL) transmissions of the second UE, the one or more V2X traffic characteristics including at least one of a V2X application identifier, a V2X service type identifier, a group identifier, a source identifier, or a destination identifier associated with the one or more V2X UL transmissions.

In some cases, at least a portion of the DRX configuration is included in the assistance information.

In some examples, the information indicative of the DRX configuration is included in one or more of a Multicast and Broadcast Services (MBS) message or a Multicast Control Channel (MCCH) message. In some cases, the information indicative of the DRX configuration is included in a downlink broadcast message or a System Information Block (SIB). In some examples, the information indicative of the DRX configuration is included in a Radio Resource Control (RRC) message corresponding to the UE.

At block 1104, the process 1100 includes receiving, from the network entity, a downlink (DL) transmission associated with the second UE, wherein the DL transmission is received during the DRX on-duration. For instance, the DL transmission can be a vehicle-to-everything (V2X) downlink transmission based on a V2X UL transmission of the second UE. In some cases, the UE is a vehicle-to-everything (V2X)-capable UE associated with the network entity and the second UE.

Figure 12:
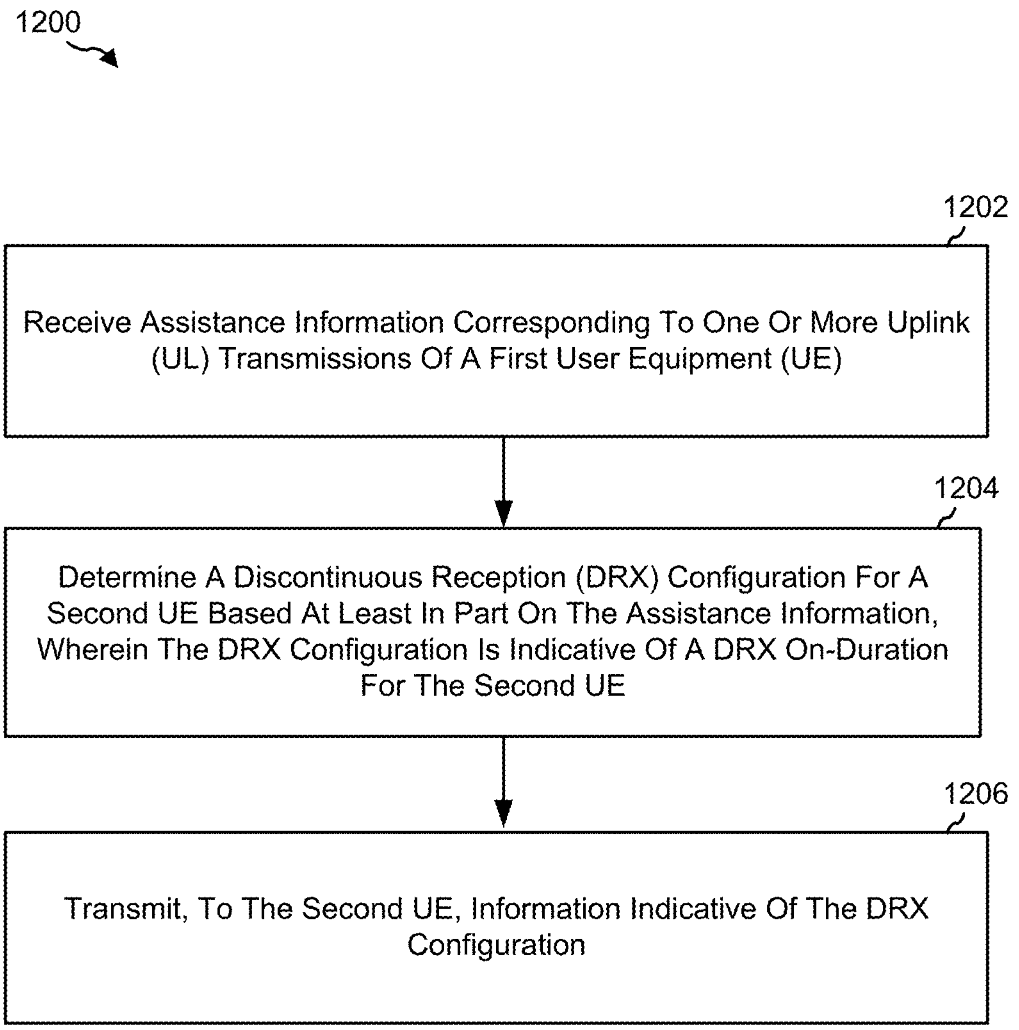
FIG. 12 is a flow chart illustrating an example of a process for wireless communications performed at a network entity, in accordance with some examples.

FIG. 12 is a flow chart illustrating an example of a process 1200 for wireless communications. The process 1200 can be performed by a network entity or by a component, system, or apparatus of the network entity (e.g., a chipset of the network entity, or other component or system of the network entity). For example, the network entity can include (or can be a component of) a server (e.g., a cloud-based server), a road side unit (RSU), a vehicle, a base station (e.g., the base station 102 of FIG. 1), a portion of a base station having a disaggregated architecture (e.g., one or more of the CU 211*c*, the DU 231*c*, the RU 241*c*, the Near-RT RIC 227*c*, or the Non-RT RIC 217*c* of the disaggregated base station 200*c* of FIG. 2C), or other network entity and/or network device.

In some cases, the network entity can be a base station, such as one or more of the base stations 822, 824, and 828 of FIG. 8 and/or the base stations 922, 924, 928 of FIG. 9A. In some examples, the network entity can be included in a RAN, such as the RAN 820 of FIG. 8 and/or the RAN 920 of FIG. 9A. In some examples, the network entity can be a 5G core network entity or component thereof, and for instance may be included in the 5GC 810 of FIG. 8 and/or the 5GC 910 of FIG. 9A. In some examples, the network entity can be included in or associated with a control plane, such as the control plane 814 of FIG. 8 and/or the control plane 914 of FIG. 9A. In some cases, the network entity can be included in or associated with a user plane, such as the user plane 812 of FIG. 8 and/or the user plane 912 of FIG. 9A.

In one illustrative example, the process 1200 can be performed by a network entity that is associated with a destination UE (e.g., the second UE described below). For instance, the process 1200 can be performed by a network entity such as a base station and/or gNB that is associated with a cell that includes the destination UE. In some cases, the destination UE associated with the network entity can be a UE (e.g., V2X UE) configured to receive a V2X transmission from a source UE (e.g., another V2X UE, such as the first UE described below). The source UE can be associated with a source network entity (e.g., base station, gNB, etc.). The source network entity can be the same as or different than the network entity associated with the destination UE. For instance, the V2X source UE (e.g., "the first UE" described below) can be the same as or similar to the V2X UE 808 of FIG. 8 and/or the V2X UE 908 of FIG. 9A. The V2X-capable destination UE (e.g., "the second UE"

described below) can be the same as or similar to the V2X-capable UE 804 of FIG. 8 and/or the V2X-capable UE 904 of FIG. 9A.

Figure 13:
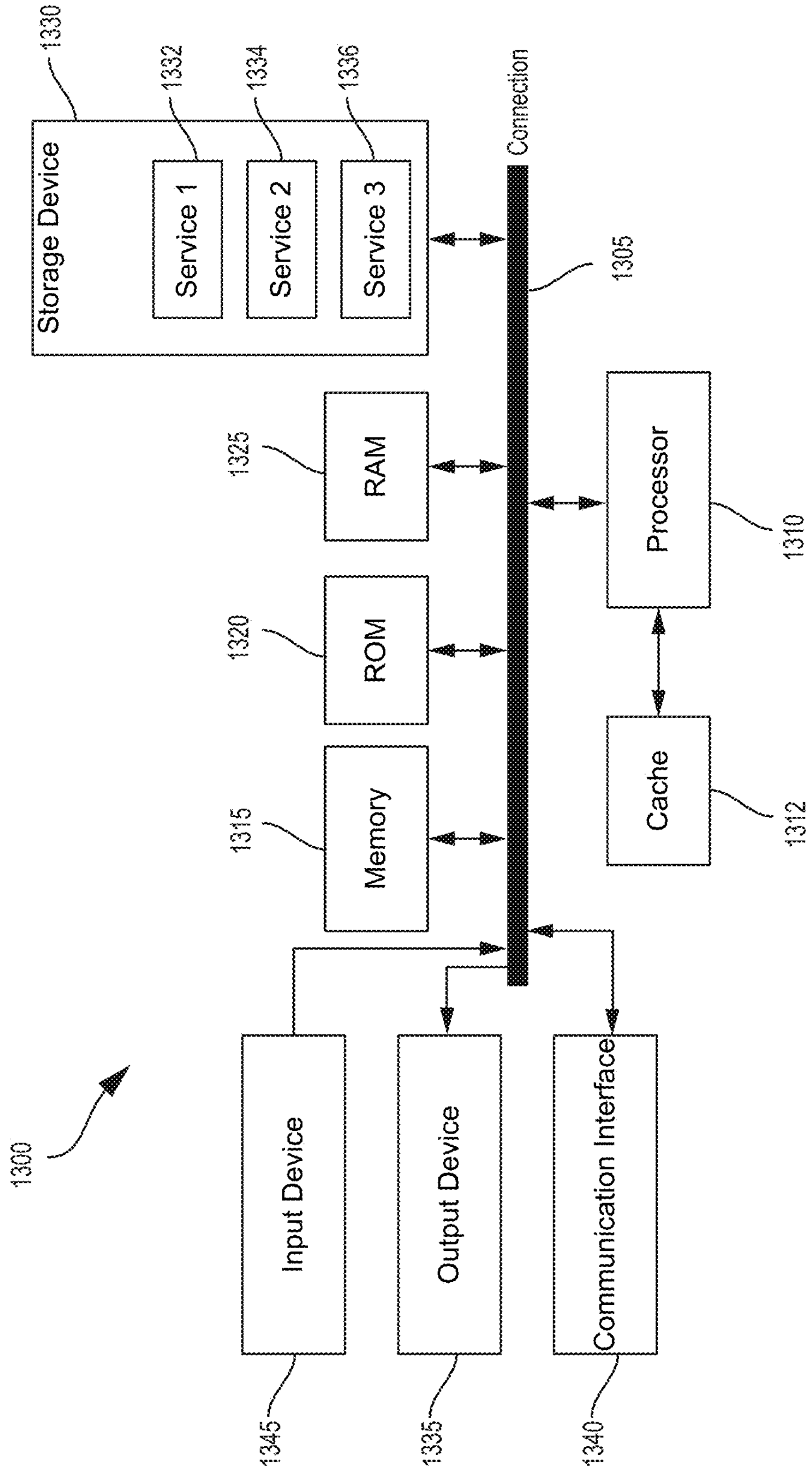
FIG. 13 illustrates an example computing system, in accordance with some examples.

The operations of the process 1200 may be implemented as software components that are executed and run on one or more processors (e.g., the control system 452 or other system of the vehicle computing system 450 of FIG. 4, the processor(s) 584 of FIG. 5, the processor 1310 of FIG. 13, or other processor(s)) of the network entity. Further, the transmission and reception of signals by the wireless communications device in the process 1200 may be enabled, for example, by one or more antennas and/or one or more transceivers (e.g., wireless transceiver(s)) of the network device (e.g., the communications system 458 of FIG. 4, the antenna 587 and/or the wireless transceiver(s) 578 of FIG. 5, the communications interface 1340 of FIG. 13, and/or other antenna(es) or transceiver(s)).

At block 1202, the process 1200 includes receiving assistance information corresponding to one or more uplink (UL) transmissions of a first user equipment (UE). For instance, the one or more UL transmissions can be vehicle-to-everything (V2X) UL transmissions. In some cases, the assistance information can be received from a first UE that is a V2X source UE the same as or similar to the V2X UE 808 of FIG. 8 and/or the V2X UE 908 of FIG. 9A.

In some examples, the assistance information is indicative of one or more vehicle-to-everything (V2X) traffic characteristics of one or more V2X UL transmissions of the first UE. The one or more V2X traffic characteristics can include at least one of a cast type, a periodicity, a V2X application identifier, a V2X service type identifier, a group identifier, a source identifier, or a destination identifier associated with the one or more V2X UL transmissions of the first UE.

At block 1204, the process 1200 includes determining a discontinuous reception (DRX) configuration for a second UE based at least in part on the assistance information, wherein the DRX configuration is indicative of a DRX on-duration for the second UE. For instance, the second UE can be a V2X-capable destination UE of the V2X UL transmissions from the first UE. In some examples, the second UE can be a V2X-capable destination UE that is the same as or similar to the V2X-capable UE 804 of FIG. 8 and/or the V2X-capable UE 904 of FIG. 9A.

In some cases, determining the DRX configuration is based on the network entity determining a periodicity of the one or more UL transmissions of the first UE (e.g., V2X UL transmissions). The periodicity can be determined based on the assistance information received from the first UE. In some examples, the network entity can generate the DRX configuration to align the DRX on-duration with the periodicity of the one or more UL transmissions (e.g., the one or more V2X UL transmissions of the first UE).

In some examples, the assistance information is indicative of at least a portion of the DRX configuration information. For instance, the first UE (e.g., V2X UE 808 of FIG. 8 and/or V2X UE 908 of FIG. 9A) can determine at least a portion of the DRX configuration information and include the determined portion of the DRX configuration information in the assistance information transmitted to the network entity.

At block 1206, the process 1200 includes transmitting, to the second UE, information indicative of the DRX configuration. For instance, the information indicative of the DRX configuration can be included in one or more of a Multicast and Broadcast Services (MBS) message, a Multicast Control Channel (MCCH) message, a downlink broadcast message, a System Information Block (SIB), or a Radio Resource Control (RRC) message transmitted by the network entity.

In some cases, the network entity can transmit, to the second UE, a downlink (DL) transmission associated with the first UE, wherein the DL transmission is transmitted during the DRX on-duration. For instance, the DL transmission can be a V2X downlink transmission. In some cases, the network entity can receive the assistance information from a second network entity, wherein the second network entity is one of a Radio Access Network (RAN) node, an Access and Mobility Management Function (AMF), or a V2X application server associated with the first UE.

The network entity, network device, and/or a wireless communication device (e.g., UE) may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 1000 of FIG. 10 and/or other processed described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000 and/or other processed described herein may be illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 is a block diagram illustrating an example of a computing system 1300, which may be employed by the disclosed system for enhanced VRU prediction through cloud-based processing. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. An apparatus of a user equipment (UE) for wireless communication, comprising: at least one memory; and at least one processor coupled to the at least one memory, wherein the at least one processor is configured to: determine assistance information corresponding to one or more uplink (UL) transmissions of the UE, wherein the assistance information is indicative of a periodicity of the one or more UL transmissions and one or more traffic characteristics of the one or more UL transmissions; and transmit, to a network entity, the assistance information.

Aspect 2. The apparatus of Aspect 1, wherein the one or more UL transmissions are vehicle-to-everything (V2X) UL transmissions, and wherein the assistance information is further indicative of one or more V2X traffic characteristics of the one or more V2X UL transmissions of the UE.

Aspect 3. The apparatus of Aspect 2, wherein the one or more V2X traffic characteristics include at least one of a cast type or a periodicity of the one or more V2X UL transmissions of the UE.

Aspect 4. The apparatus of any of Aspects 2 to 3, wherein the one or more V2X traffic characteristics include at least one of a V2X application identifier, a V2X service type identifier, a group identifier, a source identifier, or a destination identifier associated with the one or more V2X UL transmissions of the UE.

Aspect 5. The apparatus of any of Aspects 1 to 4, wherein the assistance information is indicative of one or more quality-of-service (QOS) parameter values associated with the one or more V2X UL transmissions of the UE.

Aspect 6. The apparatus of any of Aspects 1 to 5, wherein the assistance information is indicative of at least a portion of a discontinuous reception (DRX) configuration information associated with the one or more V2X UL transmissions of the UE.

Aspect 7. The apparatus of Aspect 6, wherein a DRX on-duration associated with the DRX configuration information is aligned with the periodicity of the one or more V2X UL transmissions of the UE.

Aspect 8. The apparatus of any of Aspects 1 to 7, wherein the assistance information is included in one or more of a V2X transmit (Tx) profile of the UE or a quality-of-service (QoS) profile of the UE.

Aspect 9. The apparatus of any of Aspects 1 to 8, wherein: the network entity is a Radio Access Network (RAN) node associated with the UE; and the assistance information is based on a Radio Resource Control (RRC) message from the UE to the RAN node.

Aspect 10. The apparatus of any of Aspects 1 to 9, wherein: the network entity is an Access and Mobility Management Function (AMF) associated with the UE; and the assistance information is based on a Non-Access Stratum (NAS) message from the UE to the AMF.

Aspect 11. The apparatus of any of Aspects 1 to 10, wherein: the network entity is a V2X application server associated with the UE; and the assistance information is based on a user plane message from the UE to the V2X application server.

Aspect 12. An apparatus of a user equipment (UE) for wireless communication, comprising: at least one memory; and at least one processor coupled to the at least one memory, wherein the at least one processor is configured to: receive, from a network entity, information indicative of a discontinuous reception (DRX) configuration, wherein the DRX configuration is indicative of a DRX on-duration for the UE, and wherein the DRX configuration is associated with assistance information of a second UE different from the UE; and receive, from the network entity, a downlink (DL) transmission associated with the second UE, wherein the DL transmission is received during the DRX on-duration.

Aspect 13. The apparatus of Aspect 12, wherein: the DL transmission is a vehicle-to-everything (V2X) downlink transmission based on a V2X UL transmission of the second UE.

Aspect 14. The apparatus of any of Aspects 12 to 13, wherein the DRX configuration is based on a periodicity of one or more vehicle-to-everything (V2X) uplink (UL) transmissions of the second UE, and wherein the DRX on-duration is aligned with the periodicity of the one or more V2X UL transmissions.

Aspect 15. The apparatus of any of Aspects 12 to 14, wherein the assistance information is indicative of one or more vehicle-to-everything (V2X) traffic characteristics of one or more V2X uplink (UL) transmissions of the second UE, the one or more V2X traffic characteristics including at least one of a V2X application identifier, a V2X service type identifier, a group identifier, a source identifier, or a destination identifier associated with the one or more V2X UL transmissions.

Aspect 16. The apparatus of any of Aspects 12 to 15, wherein at least a portion of the DRX configuration is included in the assistance information.

Aspect 17. The apparatus of any of Aspects 12 to 16, wherein the information indicative of the DRX configuration is included in one or more of a Multicast and Broadcast Services (MBS) message or a Multicast Control Channel (MCCH) message.

Aspect 18. The apparatus of any of Aspects 12 to 17, wherein the information indicative of the DRX configuration is included in a downlink broadcast message or a System Information Block (SIB).

Aspect 19. The apparatus of any of Aspects 12 to 18, wherein the information indicative of the DRX configuration is included in a Radio Resource Control (RRC) message corresponding to the UE.

Aspect 20. The apparatus of any of Aspects 12 to 19, wherein the UE is a vehicle-to-everything (V2X)-capable UE associated with the network entity and the second UE.

Aspect 21. A network entity for wireless communications, the network entity comprising: at least one memory; and at least one processor coupled to the at least one memory, wherein the at least one processor is configured to: receive assistance information corresponding to one or more uplink (UL) transmissions of a first user equipment (UE); determine a discontinuous reception (DRX) configuration for a second UE based at least in part on the assistance information, wherein the DRX configuration is indicative of a DRX on-duration for the second UE; and transmit, to the second UE, information indicative of the DRX configuration.

Aspect 22. The network entity of Aspect 21, wherein that least one processor is further configured to: transmit, to the second UE, a downlink (DL) transmission associated with the first UE, wherein the DL transmission is transmitted during the DRX on-duration.

Aspect 23. The network entity of Aspect 22, wherein: the one or more UL transmissions are vehicle-to-everything (V2X) uplink transmissions; and the DL transmission is a V2X downlink transmission.

Aspect 24. The network entity of any of Aspects 21 to 23, wherein, to determine the DRX configuration, the at least one processor is configured to: determine a periodicity of the one or more UL transmissions based on the assistance information; and align the DRX on-duration with the periodicity of the one or more UL transmissions.

Aspect 25. The network entity of any of Aspects 21 to 24, wherein: the assistance information is indicative of one or more vehicle-to-everything (V2X) traffic characteristics of one or more V2X UL transmissions of the first UE; and the one or more V2X traffic characteristics include at least one of a cast type, a periodicity, a V2X application identifier, a V2X service type identifier, a group identifier, a source identifier, or a destination identifier associated with the one or more V2X UL transmissions of the first UE.

Aspect 26. The network entity of any of Aspects 21 to 25, wherein the assistance information is indicative of at least a portion of the DRX configuration information.

Aspect 27. The network entity of any of Aspects 21 to 26, wherein the information indicative of the DRX configuration is included in one or more of a Multicast and Broadcast Services (MBS) message, a Multicast Control Channel (MCCH) message, a downlink broadcast message, a System Information Block (SIB), or a Radio Resource Control (RRC) message transmitted by the network entity.

Aspect 28. The network entity of any of Aspects 21 to 27, wherein the at least one processor is configured to receive the assistance information from a second network entity, and wherein the second network entity is one of a Radio Access Network (RAN) node, an Access and Mobility Management Function (AMF), or a V2X application server associated with the first UE.

Aspect 29. A method of wireless communications performed at a user equipment (UE), the method comprising: determining assistance information corresponding to one or more vehicle-to-everything (V2X) uplink (UL) transmissions of the UE, wherein the assistance information is indicative of a periodicity of the one or more V2X UL transmissions; and transmitting, to a network entity, the assistance information.

Aspect 30. The method of Aspect 29, wherein the assistance information is further indicative of one or more V2X traffic characteristics of the one or more V2X UL transmissions, and wherein the one or more V2X traffic characteristics include at least one of a V2X application identifier, a V2X service type identifier, a group identifier, a source identifier, a destination identifier, or a cast type associated with the one or more V2X UL transmissions of the UE.

Aspect 31. The method of any of Aspects 29 to 30, wherein the assistance information is further indicative of one or more V2X traffic characteristics of the one or more V2X UL transmissions of the UE.

Aspect 32. The method of Aspect 31, wherein the one or more V2X traffic characteristics include at least one of a cast type or a periodicity of the one or more V2X UL transmissions of the UE.

Aspect 33. The method of any of Aspects 31 to 32, wherein the one or more V2X traffic characteristics include at least one of a V2X application identifier, a V2X service type identifier, a group identifier, a source identifier, or a destination identifier associated with the one or more V2X UL transmissions of the UE.

Aspect 34. The method of any of Aspects 29 to 33, wherein the assistance information is indicative of one or more quality-of-service (QOS) parameter values associated with the one or more V2X UL transmissions of the UE.

Aspect 35. The method of any of Aspects 29 to 34, wherein the assistance information is indicative of at least a portion of a discontinuous reception (DRX) configuration information associated with the one or more V2X UL transmissions of the UE.

Aspect 36. The method of Aspect 35, wherein a DRX on-duration associated with the DRX configuration information is aligned with the periodicity of the one or more V2X UL transmissions of the UE.

Aspect 37. The method of any of Aspects 29 to 36, wherein the assistance information is included in one or more of a V2X transmit (Tx) profile of the UE or a quality-of-service (QOS) profile of the UE.

Aspect 38. The method of any of Aspects 29 to 37, wherein: the network entity is a Radio Access Network (RAN) node associated with the UE; and the assistance information is based on a Radio Resource Control (RRC) message from the UE to the RAN node.

Aspect 39. The method of any of Aspects 29 to 38, wherein: the network entity is an Access and Mobility Management Function (AMF) associated with the UE; and the assistance information is based on a Non-Access Stratum (NAS) message from the UE to the AMF.

Aspect 40. The method of any of Aspects 29 to 39, wherein: the network entity is a V2X application server associated with the UE; and the assistance information is based on a user plane message from the UE to the V2X application server.

Aspect 41. A method of wireless communication performed at a user equipment (UE), the method comprising: receiving, from a network entity, information indicative of a discontinuous reception (DRX) configuration, wherein the DRX configuration is indicative of a DRX on-duration for the UE, and wherein the DRX configuration is associated with assistance information of a second UE different from the UE; and receiving, from the network entity, a downlink (DL) transmission associated with the second UE, wherein the DL transmission is received during the DRX on-duration.

Aspect 42. The method of Aspect 41, wherein: the DL transmission is a vehicle-to-everything (V2X) downlink transmission based on a V2X UL transmission of the second UE.

Aspect 43. The method of any of Aspects 41 to 42, wherein the DRX configuration is based on a periodicity of one or more vehicle-to-everything (V2X) uplink (UL) transmissions of the second UE, and wherein the DRX on-duration is aligned with the periodicity of the one or more V2X UL transmissions.

Aspect 44. The method of any of Aspects 41 to 43, wherein the assistance information is indicative of one or more vehicle-to-everything (V2X) traffic characteristics of one or more V2X uplink (UL) transmissions of the second UE, the one or more V2X traffic characteristics including at least one of a V2X application identifier, a V2X service type identifier, a group identifier, a source identifier, or a destination identifier associated with the one or more V2X UL transmissions.

Aspect 45. The method of any of Aspects 41 to 44, wherein at least a portion of the DRX configuration is included in the assistance information.

Aspect 46. The method of any of Aspects 41 to 45, wherein the information indicative of the DRX configuration is included in one or more of a Multicast and Broadcast Services (MBS) message or a Multicast Control Channel (MCCH) message.

Aspect 47. The method of any of Aspects 41 to 46, wherein the information indicative of the DRX configuration is included in a downlink broadcast message or a System Information Block (SIB).

Aspect 48. The method of any of Aspects 41 to 47, wherein the information indicative of the DRX configuration is included in a Radio Resource Control (RRC) message corresponding to the UE.

Aspect 49. The method of any of Aspects 41 to 48, wherein the UE is a vehicle-to-everything (V2X)-capable UE associated with the network entity and the second UE.

Aspect 50. A method of wireless communication at a network entity, the method comprising: receiving assistance information corresponding to one or more uplink (UL) transmissions of a first user equipment (UE); determining a discontinuous reception (DRX) configuration for a second UE based at least in part on the assistance information, wherein the DRX configuration is indicative of a DRX on-duration for the second UE; and transmitting, to the second UE, information indicative of the DRX configuration.

Aspect 51. The method of Aspect 50, further comprising: transmitting, to the second UE, a downlink (DL) transmission associated with the first UE, wherein the DL transmission is transmitted during the DRX on-duration.

Aspect 52. The method of Aspect 51, wherein: the one or more UL transmissions are vehicle-to-everything (V2X) uplink transmissions; and the DL transmission is a V2X downlink transmission.

Aspect 53. The method of any of Aspects 50 to 52, wherein determining the DRX configuration comprises: determining a periodicity of the one or more UL transmissions based on the assistance information; and aligning the DRX on-duration with the periodicity of the one or more UL transmissions.

Aspect 54. The method of any of Aspects 50 to 53, wherein: the assistance information is indicative of one or more vehicle-to-everything (V2X) traffic characteristics of one or more V2X UL transmissions of the first UE; and the one or more V2X traffic characteristics include at least one of a cast type, a periodicity, a V2X application identifier, a V2X service type identifier, a group identifier, a source identifier, or a destination identifier associated with the one or more V2X UL transmissions of the first UE.

Aspect 55. The method of any of Aspects 50 to 54, wherein the assistance information is indicative of at least a portion of the DRX configuration information.

Aspect 56. The method of any of Aspects 50 to 55, wherein the information indicative of the DRX configuration is included in one or more of a Multicast and Broadcast Services (MBS) message, a Multicast Control Channel (MCCH) message, a downlink broadcast message, a System Information Block (SIB), or a Radio Resource Control (RRC) message transmitted by the network entity.

Aspect 57. The method of any of Aspects 50 to 56, further comprising receiving the assistance information from a second network entity, and wherein the second network entity is one of a Radio Access Network (RAN) node, an Access and Mobility Management Function (AMF), or a V2X application server associated with the first UE.

Aspect 58. A non-transitory computer-readable storage medium comprising instructions stored thereon which, when executed by at least one processor, causes the at least one processor to perform operations according to any of Aspects 1 to 11 or 29 to 40.

Aspect 59. A non-transitory computer-readable storage medium comprising instructions stored thereon which, when executed by at least one processor, causes the at least one processor to perform operations according to any of Aspects 12 to 20 or 41 to 49.

Aspect 60. A non-transitory computer-readable storage medium comprising instructions stored thereon which, when executed by at least one processor, causes the at least one processor to perform operations according to any of Aspects 21 to 28 or 50 to 57.

Aspect 61. An apparatus comprising one or more means for performing operations according to any of Aspects 1 to 11 or 29 to 40.

Aspect 62. An apparatus comprising one or more means for performing operations according to any of Aspects 12 to 20 or 41 to 49.

Aspect 63. An apparatus comprising one or more means for performing operations according to any of Aspects 21 to 28 or 50 to 57.

What is claimed is:

1. An apparatus of a user equipment (UE) for wireless communication, comprising:

at least one memory; and at least one processor coupled to the at least one memory, wherein the at least one processor is configured to:

determine assistance information corresponding to one or more uplink (UL) transmissions of the UE, wherein the assistance information is indicative of a periodicity of the one or more UL transmissions and one or more traffic characteristics of the one or more UL transmissions, and wherein the one or more traffic characteristics include a destination identifier for a destination UE associated with the one or more UL transmissions;

transmit, to a network entity, the assistance information; and transmit, to the network entity, the one or more UL transmissions with the periodicity, wherein the periodicity is aligned with a downlink (DL) discontinuous reception (DRX) on-duration configured for the destination UE based on a DRX configuration corresponding to the assistance information.

2. The apparatus of claim 1, wherein the one or more UL transmissions are vehicle-to-everything (V2X) UL transmissions, and wherein the assistance information is indicative of one or more V2X traffic characteristics of the one or more V2X UL transmissions of the UE.

3. The apparatus of claim 2, wherein the one or more V2X traffic characteristics include at least one of a cast type or a periodicity of the one or more V2X UL transmissions of the UE.

4. The apparatus of claim 2, wherein the one or more V2X traffic characteristics include at least one of a V2X application identifier, a V2X service type identifier, a group identifier, a source identifier, or a destination identifier associated with the one or more V2X UL transmissions of the UE.

5. The apparatus of claim 1, wherein the assistance information is indicative of one or more quality-of-service (QoS) parameter values associated with one or more vehicle-to-everything (V2X) UL transmissions of the UE.

6. The apparatus of claim 1, wherein the assistance information is indicative of at least a portion of a DRX configuration information associated with one or more vehicle-to-everything (V2X) UL transmissions of the UE.

7. The apparatus of claim 6, wherein a DRX on-duration associated with the DRX configuration information is aligned with the periodicity of the one or more V2X UL transmissions of the UE.

8. The apparatus of claim 1, wherein the assistance information is included in one or more of a vehicle-to-everything (V2X) transmit (Tx) profile of the UE or a quality-of-service (QoS) profile of the UE.

9. The apparatus of claim 1, wherein:

the network entity is a Radio Access Network (RAN) node associated with the UE; and the assistance information is based on a Radio Resource Control (RRC) message from the UE to the RAN node.

10. The apparatus of claim 1, wherein:

the network entity is an Access and Mobility Management Function (AMF) associated with the UE; and the assistance information is based on a Non-Access Stratum (NAS) message from the UE to the AMF.

11. The apparatus of claim 1, wherein:

the network entity is a vehicle-to-everything (V2X) application server associated with the UE; and the assistance information is based on a user plane message from the UE to the V2X application server.

12. An apparatus of a user equipment (UE) for wireless communication, comprising:

at least one memory; and at least one processor coupled to the at least one memory, wherein the at least one processor is configured to:

receive, from a network entity, information indicative of a discontinuous reception (DRX) configuration, wherein the DRX configuration is indicative of a DRX on-duration for the UE, and wherein the DRX configuration is determined based on assistance information corresponding to one or more uplink (UL) transmissions of a second UE different from the UE, wherein the one or more UL transmissions of the second UE include a destination identifier corresponding to the UE; and receive, from the network entity, a downlink (DL) transmission of UL traffic originated by the second UE as a source, wherein the DL transmission is received during the DRX on-duration for the UE, and wherein the DL transmission includes the one or more UL transmissions of the second UE.

13. The apparatus of claim 12, wherein:

the DL transmission is a vehicle-to-everything (V2X) downlink transmission based on a V2X UL transmission of the second UE.

14. The apparatus of claim 12, wherein the DRX configuration is based on a periodicity of one or more vehicle-to-everything (V2X) uplink (UL) transmissions of the second UE, and wherein the DRX on-duration is aligned with the periodicity of the one or more V2X UL transmissions.

15. The apparatus of claim 12, wherein the assistance information is indicative of one or more vehicle-to-everything (V2X) traffic characteristics of one or more V2X uplink (UL) transmissions of the second UE, the one or more V2X traffic characteristics including at least one of a V2X application identifier, a V2X service type identifier, a group identifier, a source identifier, or a destination identifier associated with the one or more V2X UL transmissions.

16. The apparatus of claim 12, wherein at least a portion of the DRX configuration is included in the assistance information.

17. The apparatus of claim 12, wherein the information indicative of the DRX configuration is included in one or more of a Multicast and Broadcast Services (MBS) message or a Multicast Control Channel (MCCH) message.

18. The apparatus of claim 12, wherein the information indicative of the DRX configuration is included in a downlink broadcast message or a System Information Block (SIB).

19. The apparatus of claim 12, wherein the information indicative of the DRX configuration is included in a Radio Resource Control (RRC) message corresponding to the UE.

20. The apparatus of claim 12, wherein the UE is a vehicle-to-everything (V2X)-capable UE associated with the network entity and the second UE.

21. A network entity for wireless communications, the network entity comprising:

at least one memory; and at least one processor coupled to the at least one memory, wherein the at least one processor is configured to:

receive assistance information corresponding to one or more uplink (UL) transmissions of a first user equipment (UE);

determine a discontinuous reception (DRX) configuration for a second UE based at least in part on the assistance information from the first UE, the second UE different from the first UE, wherein the DRX configuration is indicative of a downlink (DL) DRX on-duration for the second UE, and wherein the DL DRX on-duration for the second UE is aligned with an UL periodicity of the one or more UL transmissions of the first UE; and transmit, to the second UE, information indicative of the DRX configuration.

22. The network entity of claim 21, wherein that least one processor is further configured to:

transmit, to the second UE, a DL transmission associated with the first UE, wherein the DL transmission is transmitted during the DL DRX on-duration.

23. The network entity of claim 22, wherein:

the one or more UL transmissions are vehicle-to-everything (V2X) uplink transmissions; and the DL transmission is a V2X downlink transmission.

24. The network entity of claim 21, wherein, to determine the DRX configuration, the at least one processor is configured to:

determine a periodicity of the one or more UL transmissions based on the assistance information; and align the DL DRX on-duration with the periodicity of the one or more UL transmissions.

25. The network entity of claim 21, wherein:

the assistance information is indicative of one or more vehicle-to-everything (V2X) traffic characteristics of one or more V2X UL transmissions of the first UE; and the one or more V2X traffic characteristics include at least one of a cast type, a periodicity, a V2X application identifier, a V2X service type identifier, a group identifier, a source identifier, or a destination identifier associated with the one or more V2X UL transmissions of the first UE.

26. The network entity of claim 21, wherein the assistance information is indicative of at least a portion of the DRX configuration information.

27. The network entity of claim 21, wherein the information indicative of the DRX configuration is included in one or more of a Multicast and Broadcast Services (MBS) message, a Multicast Control Channel (MCCH) message, a downlink broadcast message, a System Information Block (SIB), or a Radio Resource Control (RRC) message transmitted by the network entity.

28. The network entity of claim 21, wherein the at least one processor is configured to receive the assistance information from a second network entity, and wherein the second network entity is one of a Radio Access Network (RAN) node, an Access and Mobility Management Function (AMF), or a V2X application server associated with the first UE.

29. A method of wireless communications performed at a user equipment (UE), the method comprising:

determining assistance information corresponding to one or more vehicle-to-everything (V2X) uplink (UL) transmissions of the UE, wherein the assistance information is indicative of a periodicity of the one or more V2X UL transmissions and one or more traffic characteristics including a destination identifier for a destination UE associated with the one or more UL transmissions;

transmitting, to a network entity, the assistance information; and transmitting, to the network entity, the one or more UL transmissions with the periodicity, wherein the periodicity is aligned with a downlink (DL) discontinuous reception (DRX) on-duration configured for the destination UE based on a DRX configuration corresponding to the assistance information.

30. The method of claim 29, wherein the assistance information is further indicative of one or more V2X traffic characteristics of the one or more V2X UL transmissions, and wherein the one or more V2X traffic characteristics include at least one of a V2X application identifier, a V2X service type identifier, a group identifier, a source identifier, a destination identifier, or a cast type associated with the one or more V2X UL transmissions of the UE.

* * * * *